(12) United States Patent
Gray et al.

(10) Patent No.: US 9,491,312 B1
(45) Date of Patent: *Nov. 8, 2016

(54) TELECOMMUNICATION PRICE-BASED ROUTING APPARATUS, SYSTEM AND METHOD

(71) Applicant: Level 3 Communications, LLC, Broomfield, CO (US)

(72) Inventors: William Gray, Boulder, CO (US); Binchao Chen, Broomfield, CO (US); Peder Hans Engebretson, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/638,280

(22) Filed: Mar. 4, 2015

Related U.S. Application Data

(63) Continuation of application No. 14/604,555, filed on Jan. 23, 2015.

(60) Provisional application No. 61/930,728, filed on Jan. 23, 2014, provisional application No. 62/057,874, filed on Sep. 30, 2014, provisional application No. 62/057,909, filed on Sep. 30, 2014.

(51) Int. Cl.
*H04M 11/00* (2006.01)
*H04M 15/00* (2006.01)
*H04W 40/18* (2009.01)

(52) U.S. Cl.
CPC ......... *H04M 15/8061* (2013.01); *H04M 15/60* (2013.01); *H04M 15/887* (2013.01); *H04W 40/18* (2013.01)

(58) Field of Classification Search
CPC .................. H04W 4/24; H04W 4/26
USPC .............. 455/406, 407; 379/115.01, 114.03; 705/7.31, 30; 370/395.21, 254, 235, 370/486, 230
See application file for complete search history.

(56) References Cited

U.S. PATENT DOCUMENTS

| | | | | |
|---|---|---|---|---|
| 6,338,046 | B1 * | 1/2002 | Saari | G06Q 30/0283 379/115.01 |
| 6,408,174 | B1 * | 6/2002 | Steijer | H04M 15/22 455/406 |
| 6,950,407 | B1 * | 9/2005 | Huddle | H04L 12/14 370/254 |
| 8,130,793 | B2 * | 3/2012 | Edwards | H04M 15/00 370/486 |
| 8,228,791 | B2 * | 7/2012 | Bugenhagen | H04L 12/14 370/230 |
| 8,369,500 | B2 * | 2/2013 | Krishnamoorthy | G06Q 40/00 379/114.03 |
| 8,706,863 | B2 * | 4/2014 | Fadell | H04M 15/00 370/395.2 |
| 8,750,158 | B2 * | 6/2014 | Morrill | H04M 15/00 370/253 |

(Continued)

OTHER PUBLICATIONS

Quantitative Tools for Service Operations Management by Dr. Scott Sampson © 2012, Forecasting with Seasonality, Mar. 30, 2013, http://services.byu.edu/t/quant/index.html.*

(Continued)

*Primary Examiner* — Charles Shedrick

(57) ABSTRACT

Aspects of the present disclosure relate to telecommunications networks, processing and routing calls between networks, a computing system and methodologies for optimizing pricing particularly in situations with massive amounts of data, processing call volume data, deseasonalizing data, minutes of use data, establishing and distributing pricing data for use in routing decisions, among other features and advantages.

18 Claims, 18 Drawing Sheets

(56) References Cited

U.S. PATENT DOCUMENTS

| | | | |
|---|---|---|---|
| 2003/0118029 A1* | 6/2003 | Maher, III | H04L 41/5022 370/395.21 |
| 2005/0071454 A1* | 3/2005 | Ellis | H04W 4/24 709/223 |
| 2007/0195700 A1* | 8/2007 | Katoh | H04L 12/2602 370/235 |
| 2007/0281663 A1* | 12/2007 | Sandholm | H04L 12/14 455/406 |
| 2010/0106561 A1* | 4/2010 | Peredriy | G06Q 30/0202 705/7.31 |
| 2010/0185534 A1* | 7/2010 | Satyavolu | G06Q 10/063 705/30 |
| 2013/0196626 A1* | 8/2013 | Zalmanovitch | H04W 24/02 455/407 |
| 2013/0237184 A1* | 9/2013 | Cattan | H04W 24/02 455/406 |
| 2014/0099916 A1* | 4/2014 | Mallikarjunan | H04W 8/20 455/406 |
| 2014/0233558 A1* | 8/2014 | Francis | H04L 43/045 370/352 |
| 2015/0133079 A1* | 5/2015 | Smith | H04W 16/14 455/406 |

OTHER PUBLICATIONS

U.S. Appl. No. 14/638,327, filed Mar. 4, 2015, Gray et al.
U.S. Appl. No. 14/638,388, filed Mar. 4, 2015, Gray et al.

* cited by examiner

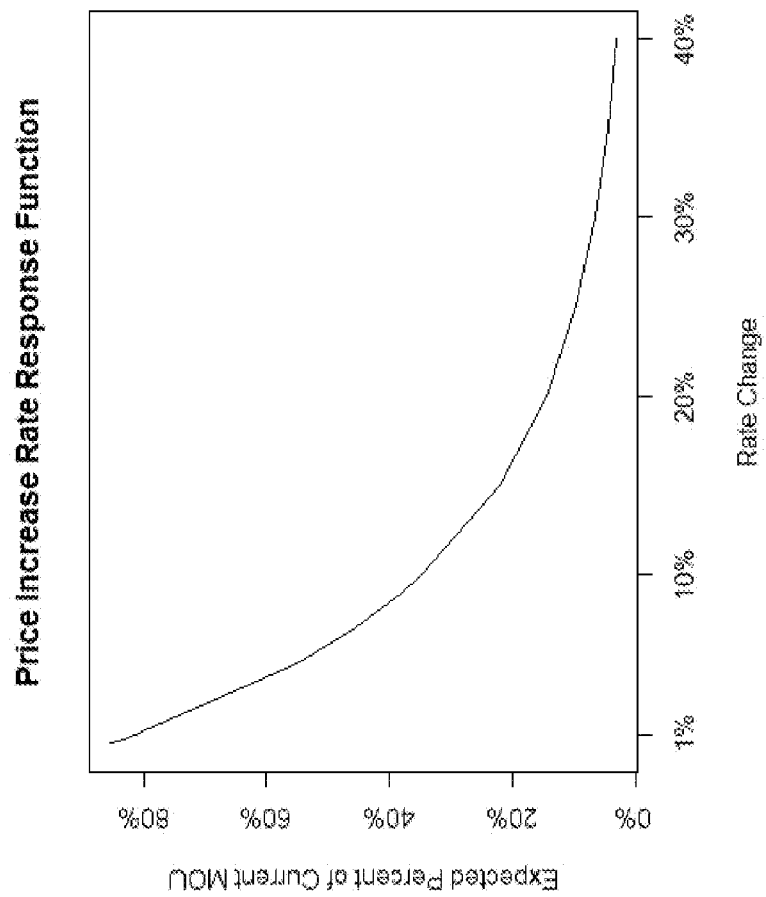

| λ | 1 week | 2 weeks | 4 weeks | 8 weeks |
|---|---|---|---|---|
| 0.0 | 1.00 | 1.00 | 1.00 | 1.00 |
| 0.1 | 1.00 | 0.90 | 0.81 | 0.73 |
| 0.2 | 1.00 | 0.80 | 0.64 | 0.51 |
| 0.3 | 1.00 | 0.70 | 0.49 | 0.34 |
| 0.4 | 1.00 | 0.60 | 0.36 | 0.22 |
| 0.5 | 1.00 | 0.50 | 0.25 | 0.13 |
| 0.6 | 1.00 | 0.40 | 0.16 | 0.06 |
| 0.7 | 1.00 | 0.30 | 0.09 | 0.03 |
| 0.8 | 1.00 | 0.20 | 0.04 | 0.01 |
| 0.9 | 1.00 | 0.10 | 0.01 | 0.00 |
| 1.0 | 1.00 | 0.00 | 0.00 | 0.00 |

FIG. 11A

| Expected distribution historical period | P Value | λ |
|---|---|---|
| 1 week | 0.04203 | 1.000 |
| 2 weeks | 0.00229 | 0.600 |
| 4 weeks | 0.00002 | 0.360 |
| 8 weeks | 0.00000 | 0.216 |

λ weighted p-value: 0.020

FIG. 11B

| Volume Change | Rate Change Type | | |
|---|---|---|---|
| | New | Increase | Decrease |
| Zero/Low Volume (Before & After) | Neutral | Neutral | Neutral |
| No Significant Change | Not Positive | Positive | Negative |
| Significant Increase | Determined by Margin Change | Positive | Determined by Margin Change |
| Significant Decrease | Not Positive | Determined by Margin Change | Negative |

FIG. 13

TELECOMMUNICATION PRICE-BASED ROUTING APPARATUS, SYSTEM AND METHOD

RELATED APPLICATIONS

This continuation application claims priority under 35 U.S.C. §120 from co-pending U.S. nonprovisional application Ser. No. 14/604,555 entitled "TELECOMMUNICATION PRICE-BASED ROUTING APPARATUS, SYSTEM AND METHOD," filed on Jan. 23, 2015, which claims priority under 35 U.S.C. §119 to U.S. provisional application No. 61/930,728 entitled "PRICE OPTIMIZATION APPARATUS, SYSTEM AND METHOD," filed on Jan. 23, 2014. This application also claims priority under 35 U.S.C. §119 from U.S. provisional application No. 62/057,874 entitled "SYSTEMS AND METHODS FOR DESEASONALIZING CALL VOLUME DATA," filed Sep. 30, 2014, and U.S. provisional application No. 62/057,909 entitled "SIGNIFICANT CHANGE DETECTION APPARATUS, SYSTEM AND METHOD," filed Sep. 30, 2014, all of which are fully incorporated by reference herein for all purposes.

TECHNICAL FIELD

Aspects of the present disclosure relate to telecommunications networks, processing and routing calls between networks, and a computing system and methodologies for optimizing pricing.

BACKGROUND

Establishing pricing for certain services, such as wholesale telecommunications services, involves the analysis and consideration of massive data records. Wholesale telecommunications services refer to those services charged to retail carriers to carry call traffic between an origination (the caller) and a destination (the one receiving the call), or over some part of the path between the origination and the destination. Retail carriers are those carriers that interact directly with a customer. In some instances a retail carrier also provides wholesale services. Nonetheless, often, a retail carrier does not have a sufficiently expansive network to connect a customer's call without the call traveling through one or more other networks. Wholesale services refer to those services charged to the retail carrier in order to connect the call to its destination, or carry some part of the call.

A wholesale provider may establish prices based on the destination of the call, based on the retail carrier for which the wholesale carrier is carrying traffic, and other factors. A retail carrier may employ a least cost routing (LCR) model that uses price, among other factors, in determining which wholesale carrier to use to terminate (carry or connect) any given call. Initially, the LCR may select the least expensive wholesale carrier to terminate a call. Often, however, the least expensive carrier cannot handle the call volume, quality is insufficient, or other factors suggest a different carrier should terminate the call so the LCR may select a different carrier until it successfully terminates the call or otherwise hands it off to a wholesale carrier.

It is with these observations in mind, among others, that various aspects of the present disclosure were conceived and developed.

SUMMARY

Implementations described and claimed herein may involve a method comprising using at least one processor coupled with a memory including computer executable instructions to perform the method, where the method includes seasonalizing call volume data and generating a probability of a call volume decrease in the seasonalized call volume data. The method further involves generating a price change recommendation for a destination associated with the call volume decrease.

Implementations may further include a system comprising at least one database including call records and price information. The system may include a pricing change and consolidation logic configured to receive call records and price information from the at least one database and generate a plurality of price recommendations for providing a telecommunication service, the pricing change and consolidation logic further configured to provide call records and price information to a computing configuration where the computing configuration is configured to generate a price testing recommendation based on the call records and price information.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. The drawings depict only typical embodiments of the present disclosure and, therefore, are not to be considered limiting in scope.

FIG. 5A-5B are example rate response functions, according to one embodiment described herein.

FIG. 11A-11B illustrates an application of a lambda parameter to p-values, according to one embodiment described herein.

FIG. 13 is a block diagram of a price rate change classification chart, according to one embodiment described herein.

DETAILED DESCRIPTION

Figure 1A:
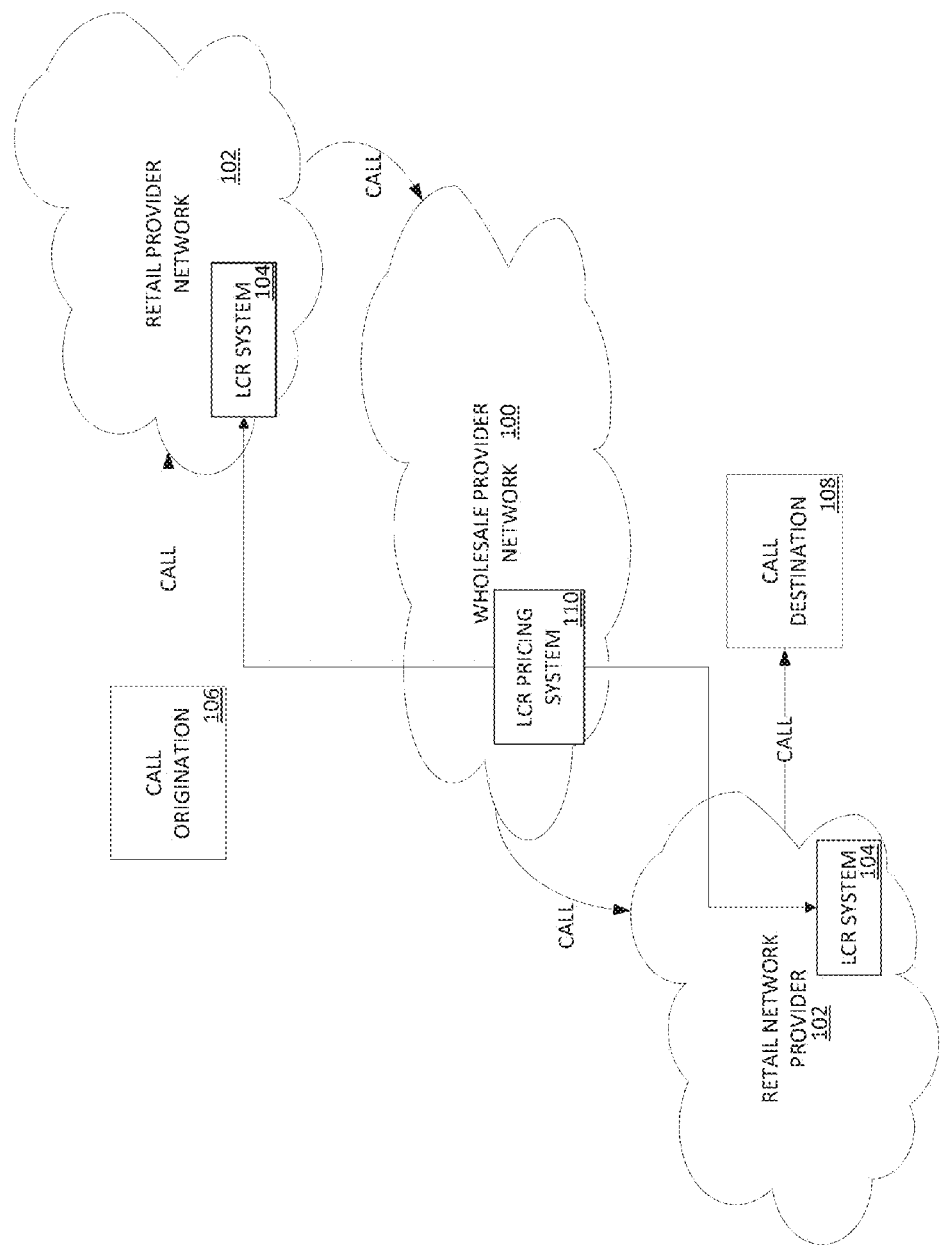
FIGS. 1A-1B are system diagrams illustrating a communication network and one possible computing architecture for providing the systems and methods disclosed herein.

Aspects of the present disclosure involve telecommunications networks, call processing, and systems for routing calls among networks. Aspects of the present disclosure further involve a system and method for processing large amounts of pricing and customer data, and using such data in establishing rates and processing calls using the rates. The system further involves dynamic price adaptation where price rate changes, which may be rate or price tests, may be automatically established and depending on the change in consumer behavior relative to the price change, the system may maintain the price change or revert to a previous or different price. The present application uses the telecommunication market, and particularly wholesale telecommunications services, as an example to illustrate the inventive concepts set out herein. The present application, however, is not limited to telecommunications services or prices, and is applicable to other markets and services where there are dynamic data sets, and consumer reaction to price changes in the form of more or less consumption of the service may be obtained and stored.

Aspects of the present disclosure may further involve a system and method for identifying specific carrier destinations and calculating respective price points for use in price testing. The recommended carrier destinations may be identified from a larger pool of carrier destinations and assigned a weight indicating how strong of a candidate the destination is for price testing. The system further involves generating a price point increase or decrease indicating the amount a price should be raised or lowered for performing various telecommunication services at the recommended destination. Depending on the change in consumer behavior relative to the price point increase or decrease, the system may maintain the price point or revert to a previous or different price.

Aspects of the present disclosure may yet further involve systems and methods for estimating expected minutes of usage ("MOU") in response to a proposed price rate change. In one specific case, the system estimates an expected MOU related to a proposed rate change for a telecommunication carrier services (e.g., voice, Internet and data) currently being consumed at a customer destination. Based in part on whether the proposed price rate change is an increase in price, or a decrease in price, the system estimates expected MOU for the customer destination, which quantifies the usage volume for the carrier services at the customer destination, if and when the proposed price change is applied. The system processes the expected MOU to determine whether the proposed price rate change would result in an expected MOU of an acceptable level at the particular customer destination. When the expected MOU indicates that the usage volume at the customer destination is acceptable, the price rate change is used to price and/or re-price the carrier services. The system may load price information into a database accessible by the carrier when running LCR determinations for call termination. Actual call volumes and minutes of use may be monitored and pricing further altered thereafter.

Aspects of the present disclosure involve a system and/or method for "deseasonalizing" call volume data by automatically removing unusual variations (e.g., variations caused by holidays, unusual daily usage patterns, etc.) from the call volume data, enabling the system to obtain and process normalized call volume data to determine the effect of rate changes and then either maintain the rate in call routing systems, obtain and use a different rate, or revert to a previous rate. Generally speaking, the normalized (deseasonalized) call volume data may be used for various purposes including price analysis and modification of prices distributed to carriers for use in least cost routing (LCR) tables that are used when connecting calls between carriers for transport between the source and destination. The normalized call volume data may be used for comparative purposes, and to perform or otherwise execute various pricing changes, resulting in optimized pricing analyses. The deseasonalized data may be used to perform call volume loss detection, call volume gains, or margin increases or decreases, whether or not accompanied by a volume increase, among other uses. For example, if price changes are instituted, by comparing current call volumes with previous call volumes, the system can more accurately determine if a price change affected volume and/or margins, as opposed to some other factor (e.g., a holiday). From this information, it is possible to then modify pricing and upload modified price schedules into LCR tables and then connect calls using such tables.

Aspects of the present disclosure may further involve a system and method for detecting significant changes in call volume, including volume loss in call volume data. In various aspects, the system calculates an expected distribution for a set of call quantities based on historic call quantity data. Once generated, the expected distribution is applied to calculate a likeness factor value corresponding to a current call quantity at a particular destination. The likeness factor is applied to a threshold to determine whether a significant volume loss occurred at the destination. One or more tuning parameters may be applied during the calculations to account for different call volume trend patterns. Based on observations of volume loss or other volume changes, price information may be loaded into databases for application against the customer LCR algorithms, among other functions.

Aspects of the present disclosure involve a system that may classify specific price rate changes as having a positive, negative or neutral impact on margins made when offering a carrier service to a customer at a particular price rate change. Stated differently, as the price for carrier services fluctuate in response to a price rate change recommendation, customers may increase, decrease, or keep the same their consumption levels of such services, thereby potentially impacting a service provider's margins. The disclosed systems automatically classifies any impact on margin as positive, negative, or neutral, and based on such classifications, may automatically generate price reversion recommendations that may be propagated into LCR systems for use in routing decisions.

In the particular case of telecommunication services and with reference to FIG. 1A, a telecommunications environment, which may use various aspects of the present disclosure, involves a wholesale provider network 100 in communication and able to process calls from a retail provider network 102. The example network configuration is simplified and used to illustrate various aspects of the technology set out herein; however, the various technological advances set out herein are not limited to such an environment. Within the retail provider network or otherwise accessibly by such network is a LCR system 104 that may be used to select the wholesale provider 100 based in part on prices/rates for carrying a call, to connect transport some part of a call between an origination (caller) 106 and the destination of the call (receiver) 108. The wholesale network includes a LCR pricing and optimization system (LCRP) 110 (see also FIG. 1B) that processes data and generates information for distribution to an LCR system, or other similar platforms.

Figure 1B:
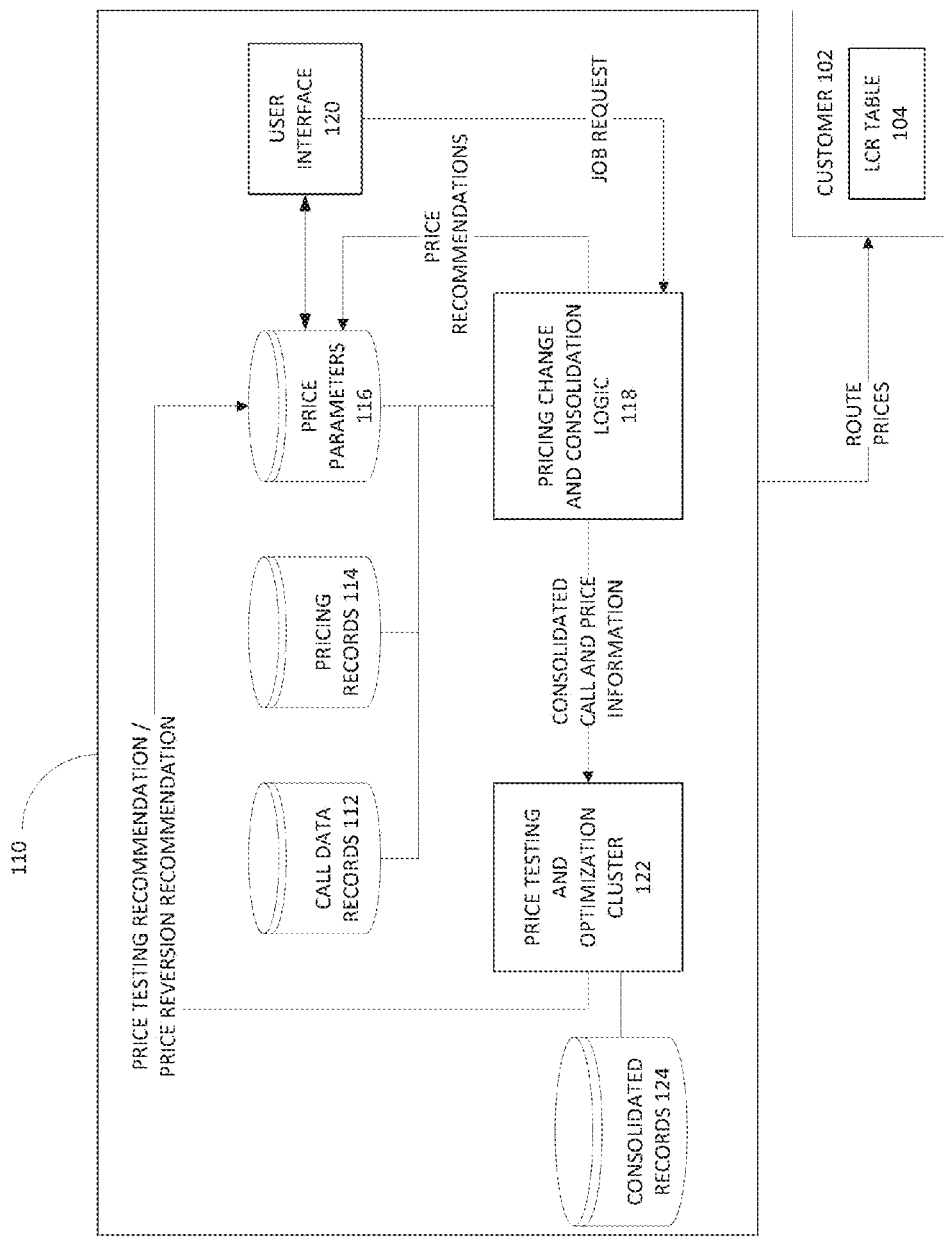

Referring to FIG. 1B, the LCRP system 110 involves a call data records database 112 that stores call records sorted by the day in which a call occurred. A call record may include numerous fields associated with the call including the phone number of the originating phone, the destination phone number, the start time, the end time, the total time, the cost, the route of the call being origination and destination and numerous other fields—100 or more possibly.

The LCRP system 110 also includes a pricing records database 114. The pricing records may include both current pricing and historical pricing. In one simple form, a pricing record may include: retail carrier, destination number (e.g., area code, prefix), and price per minute. The pricing record may be provided in some form to a carrier (e.g., retail carrier 102) and used to populate the retail carrier's LCR databases or tables 104. Accordingly, when determining whether to use the wholesale carrier 100 to terminate a given call, the LCR system will consider the price, among other factors, established by the wholesale carrier for a particular call destination (e.g., destination 108). If the call is then transported over the wholesale carrier's network (the LCR chooses the wholesale carrier to terminate (connect) the call), the price is charged to the retail carrier, which may depend on the length of the call. In such an instance, a call record is generated and stored in the call records database 112.

As part of the mechanism for generating a pricing record, the system further includes a pricing parameters database 116. The pricing parameters are used by a price change and consolidation logic server 118 to generate a pricing recommendation. Pricing parameters may include: carrier, destination, minimum price (the minimum price below which cannot be set), cost of service (incurred and planned costs to provide the service), a target price set by the customer (customer (retail provider) estimates a certain volume if the price is met), a target volume set by the customer (the volume the customer will provide at the target price), pricing parameters associated with the target price, a current price, and other information useful in establishing pricing.

The pricing change and consolidation logic (PCCL) 118 includes object based functions, which may be implemented in Java™ or other programming language, and database query objects that obtain data from the call records database 112, pricing records database 114, price parameters database 116, and consolidated records database 124. Among other functions, the PCCL generates pricing recommendations, which may also be returned to the price parameters database. While discussed herein in terms of object functions and databases, other processing functionality and data storage arrangements may be employed in any given implementation. Through a user interface 120, a user may view the price recommendations. So, in one example, should the cost parameter increase for a particular retail carrier, at a particular destination, then the PCCL functions may generate a price recommendation that is higher than the current price in order to accommodate the cost increase. Through the user interface, a user can view all price recommendations, including the particular recommendation that involved an increase. Through the user interface, the user can approve the recommendation, which may cause one or more subsequent events, including generation of call pricing information to be loaded in the customer's LCR system, and subsequent call termination based on such LCR records. The user interface may include a graphical user interface accessible with a browser from a personal computer, tablet or other device.

The PCCL may also provide call and price information (call information, pricing records and price parameters) to a price testing and optimization (PTO) logic 122. In the event that call records, price records, etc. are stored in separate databases (as illustrated), then the PCCL may consolidate the records before running the logic. The PTO may be implemented in a computing cluster with sufficient storage for the massive consolidated call and price data sets that may be processed. In one possible implementation, the cluster may involve 200 or more hyper threaded cores and 96 or more terabytes of storage.

Figure 2:
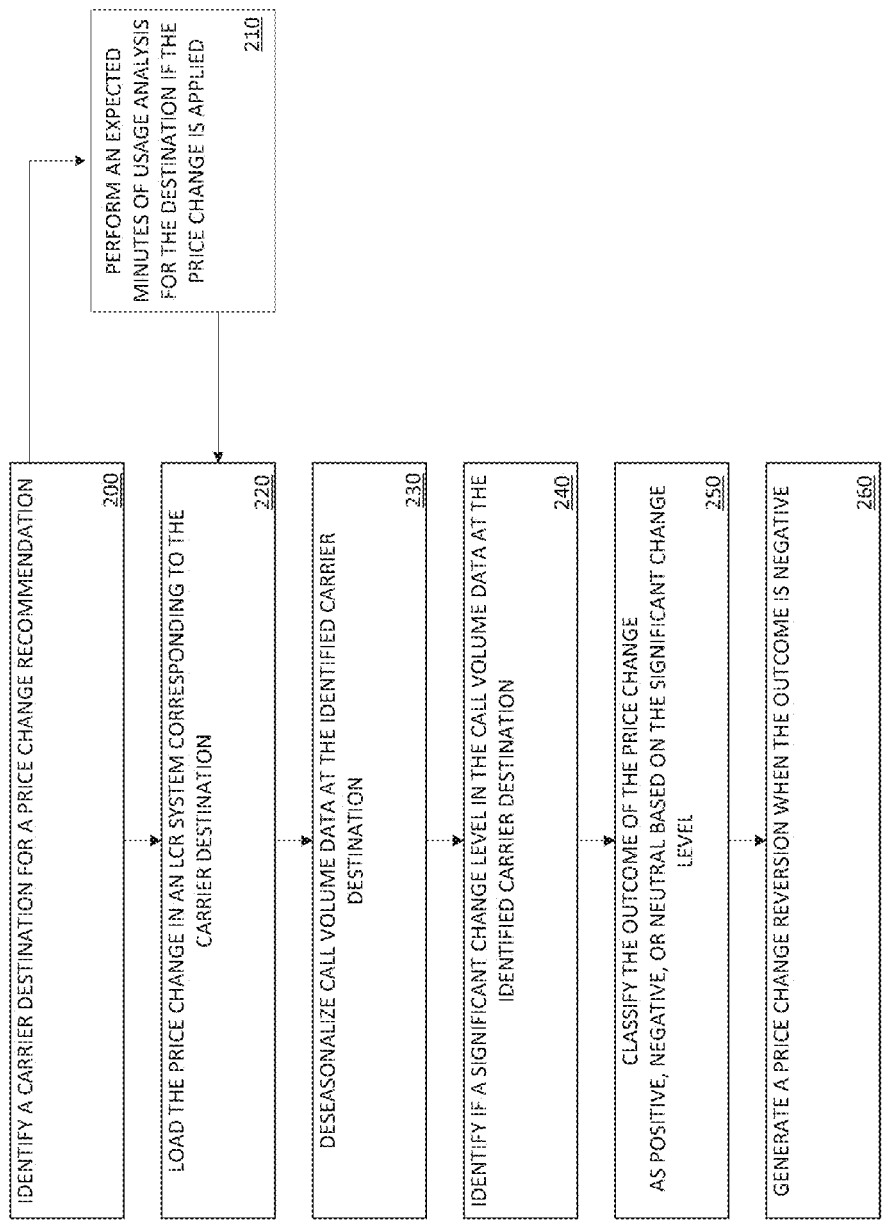
FIG. 2 is a flowchart illustrating one method of generating a price reversion after an earlier price test according to one embodiment described herein.

FIG. 2 is one example of a method that may be implemented by the PTO or other computing elements. Generally speaking, the method involves generating price testing recommendations and price reversion recommendations, which may then be propagated into LCR systems for use in routing decisions. More specifically, the PTO may identify carrier destinations for price testing or other reasons and generate price increases, above those that might be normally recommended by the PCCL logic in order to test the volume and/or margin effect that the price increase would have on the carrier. Stated differently, the PTO may generate a price increase (or decrease) test on a subset of a particular carrier's destinations in order to determine what effect the price change has on call volume and/or the margins associated with the change in volume. If call volume decreases, the decrease will be captured in the call records and subsequently provided by the PCCL to the PTO. When the decrease is also tied to a decrease in margin (or just based on volume decreases), the PTO may generate a price reversion recommendation (e.g., a recommendation to return to a former price or to otherwise decrease the price in order to recapture some or all of the lost volume and/or margin).

Referring now more specifically to FIG. 2, the system first identifies or otherwise recommends a destination(s) for a price change, such as price testing (operation 200). In one embodiment, the system may generate a price test recommendation, as described below.

Price Test Recommendation

Figure 3:
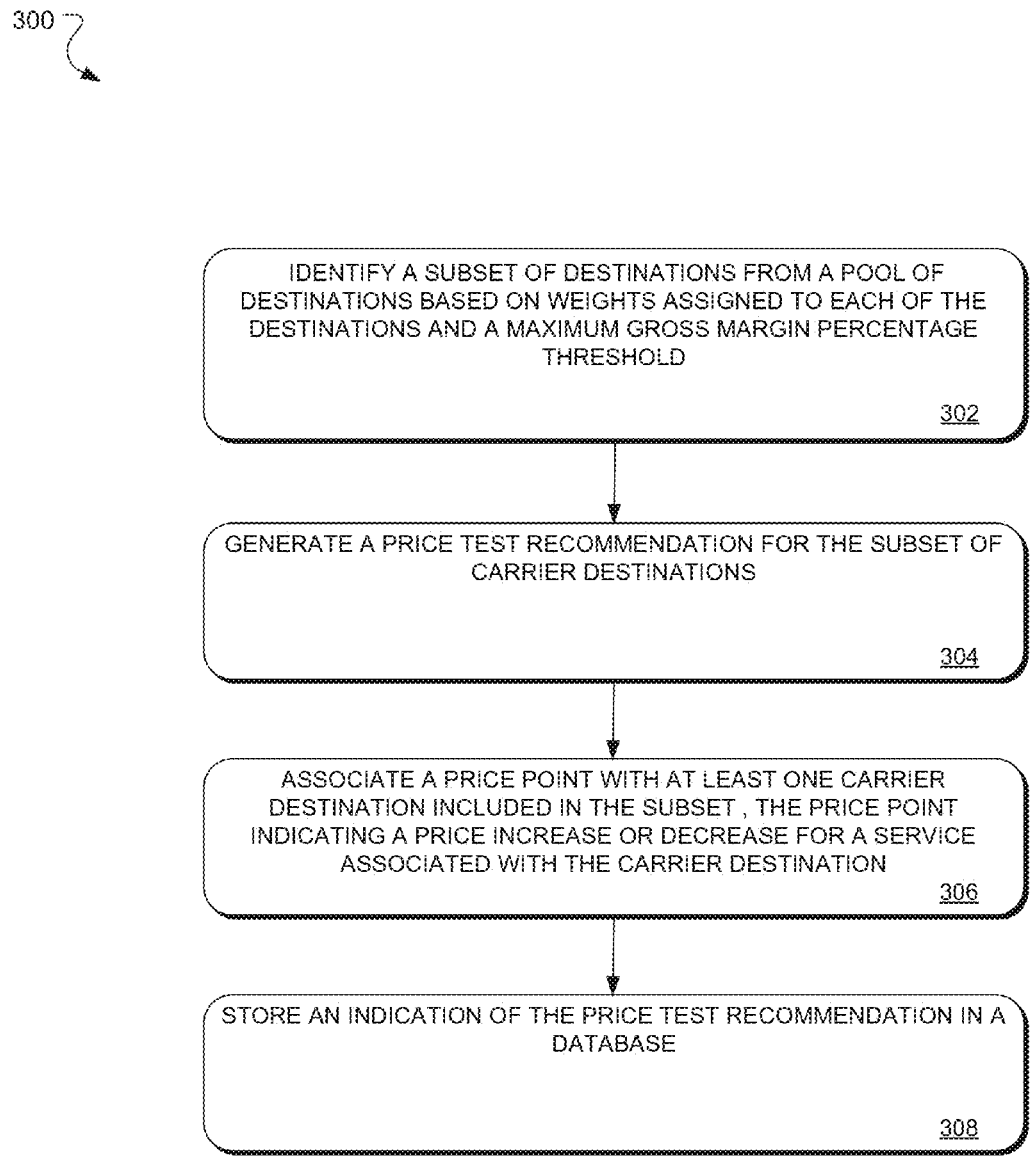
FIG. 3 is a flowchart illustrating one method of generating a price recommendation, according to one embodiment described herein.

FIG. 3 is one example of a process that may be implemented by the PTO and generally describes identifying specific retail provider destinations as potential candidates for price testing, as well as price points for use in the price testing. Stated differently, the PTO 122 may automatically recommend subsets of a particular retail provider's destinations as candidates for use in various price testing procedures performed by the PTO. For example, in one embodiment, the PTO may generate a price increase test for the recommended destinations in order to determine what effect the price increase has on the volume and/or margin of call data at the destination being price tested.

Referring now specifically to the process 300 of FIG. 3, to start, the system identifies a subset of a particular retail provider's destinations for price testing. The subset is selected from a pool of destinations based on weights applied to each particular retail provider destination and a maximum variable gross margin percentage threshold (operation 302). Generally speaking, variable gross margin quantifies the profit and/or portion of profit that a telecommunication service provider earned from a retail provider for the call data volume consumed by the retail provider at one or more destinations. The maximum variable gross margin percentage value represents a percentage of such profits that the telecommunication service provider would like to expose during a price-test. For example, assume the variable gross margin of a service for a particular retail provider is $1,000,000. A maximum variable gross margin percentage of 10% equates to $100,000 of exposure of the $1,000,000 profit.

As noted above, weights may be applied to each retail provider destination in order to increase, decrease or otherwise alter the likelihood of a destination being identified for price testing. The application of weights is a variable scheme that quantifies the particular retail provider destination's relative probability of being recommended for use in price testing. A higher weight indicates that the retail provider destination is more likely to be recommended or selected for use in price testing, in comparison to a low weight which indicates that the destination is less likely to be recommended for use in price testing. The weighting may be applied according to the time/date stamp at which the destination was originally price-tested—the older the time/date stamp, the higher weight applied to the destination. Additionally, the weighting may be represented linearly, according to a 24 month (in one example) period with a minimum weight of 0 applied when the time/date stamp of a carrier destination is less than a week, and a maximum weight of 1 applied when the time/date stamp of a carrier destination is 24 months. If a destination has not been previously price tested, it could be defaulted to the maximum weight of 1. Months in between 1 and 24 equate to an equal incremental increase in weight value. Thus, 1 month (30 days) would apply a weight of 0.0416, 12 months would apply a weight of 0.5, and so on.

Additionally, to identify the subset of destinations to be tested, the maximum variable gross margin percentage may be used to limit the number of destinations to be tested and to control the tests potential on overall profit. The pool of carrier destinations may include destinations that have been price tested in the past, and thus, could be considered for a price adjustment upward or downward to a new price point. Moreover, there may be a temporal factor applied to the destinations being tested. For example, the pool of previously price tested carrier destinations may not include destinations that were previously tested within 30 days or some other time frame.

Each retail provided destination included in the pool may be associated with an individual variable gross margin. A destination of the pool is selected and its individual variable gross margin is compared to the maximum variable gross margin. An additional retail destination is selected from the pool and added to the subset until the maximum variable gross margin is reached or otherwise satisfied. For example, assume a pool of seven candidate retail provider destinations. Eight associated with a single variable gross margin of $50 and two associated with a single variable gross margin of $300, for a total pool variable gross margin of $1,000. Assume a maximum variable gross margin percentage threshold of 12%, which could translate to a maximum variable gross margin threshold of $120 (12%*$1,000). It should be noted that the example being discussed is dramatically simplified in terms of the number of destination candidates available and the margin earned from any one candidate destination.

The PTO will select a first destination, based on weight, add it to the subset of carrier destinations, and compare its single variable gross margin to the $120 maximum gross margin and determine that the maximum gross margin threshold is greater than the collective gross margin threshold percentage of the subset. For example, if the first carrier's single gross margin was $50, then the PTO will compare it to the $120 maximum gross margin threshold. Since the threshold was not met ($50<$120) another carrier destination may be added to the subset. Accordingly, the PTO may select a second carrier destination from the pool of candidate carrier destinations, add it to the subset (now two destinations), and compare the collective gross margin of the entire subset maximum gross margin. For example, if the second carrier's single gross margin is $50, then the PTO will compare $100 to the $120 maximum gross margin threshold. Since the maximum gross margin threshold has not been satisfied ($100<$120), another carrier destination will be added to the subset. Additional carrier destinations may be selected from the pool and added to the subset until the maximum variable gross margin is satisfied. In the previous example, selecting the third carrier destination, associated with a gross margin of $50 would exceed the maximum variable gross margin percentage threshold of $120. Since the gross margin percentage threshold has been exceeded, the third carrier destination is added back to the available pool and not included in the subset of testable carrier destinations.

The identified subset of retail provider destinations is then recommended for price testing (operation 304). Destination(s) within the subset may be associated with a price point indicating how much a price should increase or decrease for any services associated with the recommended destination (operation 306). For example, the system may employ a weighted random sampler to generate a price point suggesting a 5% price increase. In another embodiment, the system may use the weighted random sampler to generate a price point suggesting a nominal price increase or decrease, such as adding $0.001 per minute of usage, or some other nominal increase in price, to the pricing at a recommended carrier destination. In one specific application, the weighted random sampler will pick an increase from a weighted sample pool which is comprised of nominal price increases paired with a weight. In one application the sum of weight is equal to 1.00 and the weighted random sampler will select an increase from the pool with the probability of the nominal increases weight divided by the total pool weight of 1.00. The table included below is an example of nominal increase amount and associated weights.

| Nominal Increase Amount | Weight |
| --- | --- |
| $0.001 | 0.50 |
| $0.002 | 0.25 |
| $0.003 | 0.25 |

The price test recommendation is provided to and stored in the price parameters database (operation 308). A user may view and approve the test price through the user interface. If approved (with or without modification), a customer price sheet is generated and distributed to the customer. The prices are then loaded in the customer's LCR system or otherwise used. The effect of the price test on call volume is then seen by the system in call volume records when the price test is in effect. Depending on the change in consumer behavior relative to the price point increase, the PTO may maintain the price point increase or revert to a previous or different price. For example, if the price point results in lower volume and/or margin at the recommended destination, the PTO may revert back to the previous price point. These recommendations may be generated directly or after additional processing, such as deseasonalization discussed below significant change detection discussed below, outcome classification discussed further below, or otherwise.

Referring again to FIG. 2, in response to the identified destination and its corresponding price change recommendation, the system may optionally perform an expected minutes of usage analysis to quantify or otherwise estimate usage volume at the identified destination if the price change is applied. (operation 210). In particular, the system may perform or otherwise generate an expected minutes of usage analysis, as described below.

Expected Minutes of Usage

Figure 4:
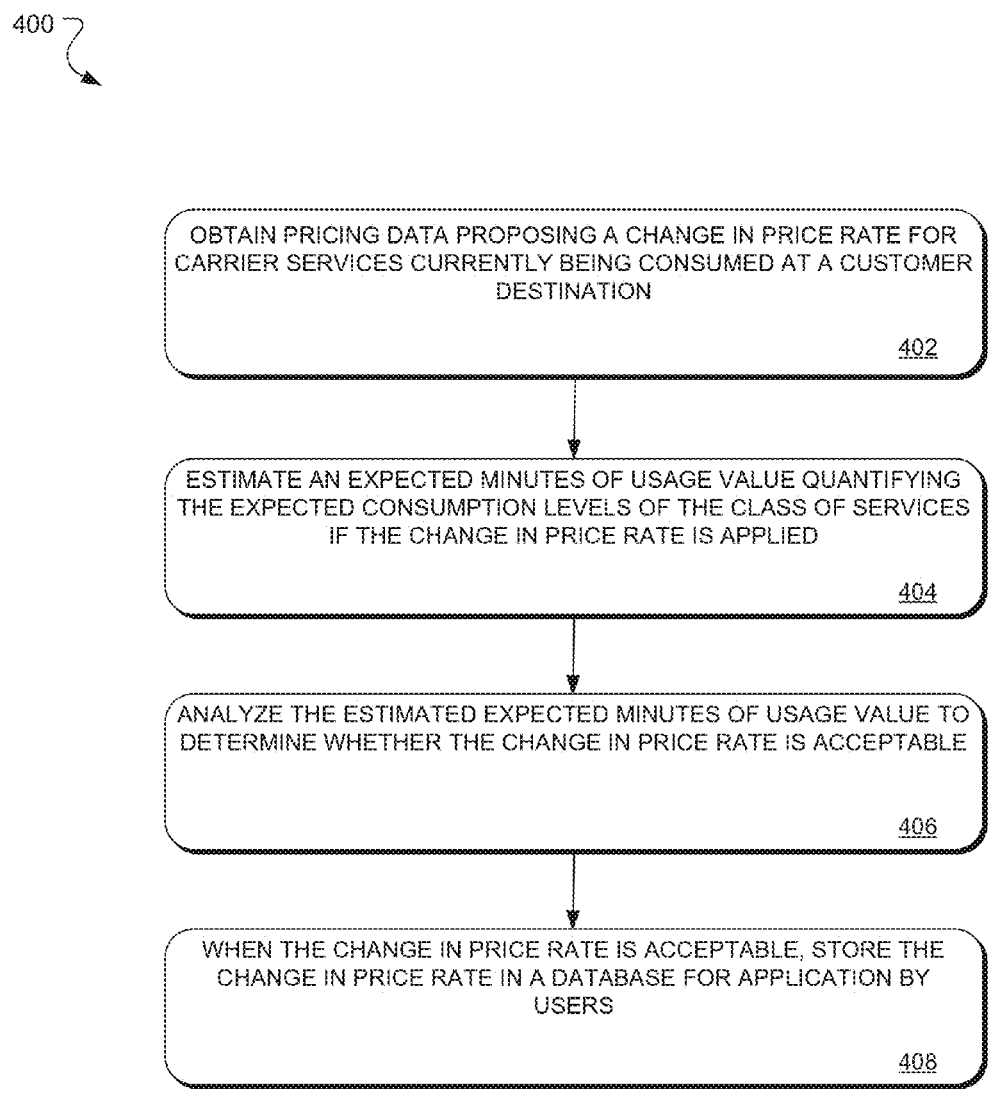
FIG. 4 is a flowchart illustrating a method of estimating minutes of usage volume, according to one embodiment described herein.

FIG. 4 is one example of a computer implemented process that may be implemented by the PCCL 118 to calculate or otherwise generate an expected MOU based on a proposed price change at the customer destination level. To begin, the system obtains pricing data for a proposed change in price for carrier services at a customer destination (operation 402). The pricing data may include, for example, a current price for carrier services at the customer destination; a proposed price for the same carrier services; and an actual MOU value quantifying the current consumption levels (on average) of the carrier services in minutes, on a per month basis or some other temporal delineation.

Next, the pricing data is used to calculate an expected MOU for carrier services at the customer destination, assuming the price change is applied (operation 404). Referring to FIG. 1, the PCCL may execute one of series of expected MOU algorithms to determine the expected MOU for the customer destination if the price change is used to price and/or re-price the cost of consuming the carrier services. More specifically, the current price rate, the current MOU, and the proposed price rate change may be provided as input to the PCCL, which generates or otherwise calculates the expected MOU.

Initially, the PCCL may implement different processes depending on whether the proposed price change rate involves an increase in price or a decrease in price. When the proposed price rate change is an increase in price, the PCCL may execute the following rate increase equation to determine the expected MOU for the price rate change:

$$MOU_{exp.} = MOU_{cur.} * \text{Max}\left(\left[1 + c_1 + \left[e^{c_2 + \ln\left(\frac{\text{Final Rate}}{\text{Current Rate}}\right)*c_3} - 1\right] * c_4\right], 0\right)$$

In one specific implementation, the expected MOU based on a rate increase equation illustrated above includes the following constants: $C_1$: 1.0, $C_2$: −0.8, $C_3$: −10.0, $C_4$: 2.0. $C_1$ and $C_2$ ensure proper calibration of the expected MOU, $C_3$ and $C_4$ account for the impact of the rate change on the expected MOU. $MOU_{exp}$ is the expected minutes of use associated with the rate increase, $MOU_{cur}$ is the current minutes of use, Final Rate is the price associated with the rate increase, and Current Rate is the current price. Other constraint values, however, are possible depending on the implementation. FIG. 5A is an illustration of a Rate Response Function 500 that illustrates the relationship between the expected MOU and a proposed increase in price. As illustrated, as the rate change increases, the expected MOU (illustrated as a percentage) decreases. Thus, any price increased typically will not produce an expected MOU volume increase, although such an increase is possible due to reasons other than price change.

For example, assume a wholesale telecommunication service provider (e.g., wholesale provider 100) previously entered into a five-year contract with a retail local exchange carrier (LEC), to provide various class carrier services including: access to its network, VOIP services, video services, among others. Under the current contract, the retail provider service is priced at $0.08 per minute of usage and the wholesale provider is interested in an understanding the ramifications of a price increase to $0.10 per minute of use (a proposed price rate change of $0.02). Based on a current MOU of 100 for the retail services being offered by the wholesale provider (e.g., network access, VOIP, video services), the PTO may execute the expected MOU rate increase equation illustrated above to obtain an expected MOU of 10 (9.6) for the proposed $0.02 price rate decrease.

When a proposed price rate change involves a decrease in price, the PTO may first search the pricing parameters database 116 to determine whether an estimated target exists for the customer destination that indicates how much volume the customer may consume at the price rate change. If no estimated volume target exists for the customer destination, the PTO may execute the following rate decrease equation to determine or otherwise obtain the expected MOU for the price rate decrease:

$$MOU_{exp.} = MOU_{cur.} + \left[\left(\frac{\text{Final Rate}}{\text{Current Rate}} - 1\right) * c_1 + c_2\right] * c_3$$

Figure 5B:
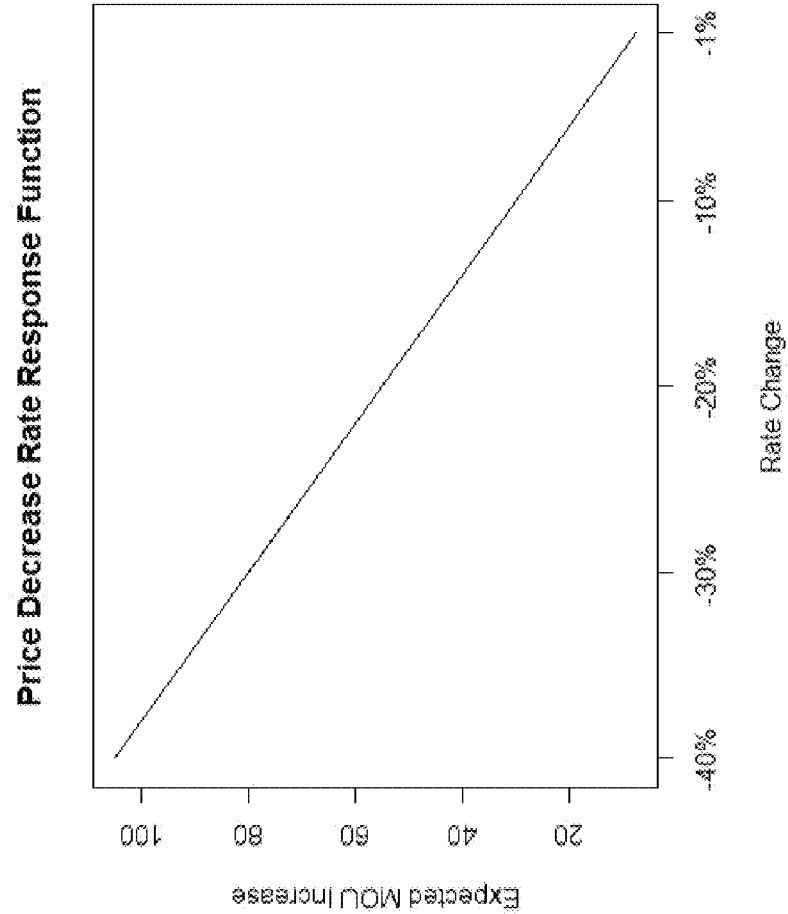

In one specific example, the rate decrease equation illustrated above includes the following constants: $C_1$: −50.0, $C_2$: 1.0, $C_3$: 5.0. $C_1$ accounts for the impact of the price decrease, $C_2$ and $C_3$ calibrate the incremental minutes of use. $MOU_{exp}$ is the expected minutes of use given the rate decrease, $MOU_{cur}$ is the current minutes of use, Final Rate is the price associated with the rate decrease, Current Rate is the current price. Other constraint values, however, are possible depending on the implementation. FIG. 5B is an illustration of a Rate Response Function 504 that illustrates the relationship between the expected MOU and the proposed price decrease. As illustrated, as the rate change decreases, the expected MOU increases. Thus, any price decreases should not produce an expected MOU volume decrease, although such a decrease is possible due to reasons other than the price change.

Generally speaking, decreases in price may result in an increase in minutes of expected usage whereas increases in price may result in a decrease in minutes of expected usage for associated customers and retail provider services. However, the relationship between an increase and price and a decrease in price is not necessarily linear. For example, in a case where the price is already optimal for a particular customer, a small price increase may result in a significant volume loss. In another example, where the price is likely not already optimal, a minor increase in price may not be significant enough to cause the minutes of expected usage to proportionally decrease, or decrease at all. And, a minor decrease in price may not be significant enough to cause the minutes of expected usage to proportionally increase, or increase at all. In such instances, since the minutes of usage did not significantly increase or decrease, there will likely be no corresponding significant increase and/or decrease in margin for the usage.

Referring to the wholesale provider/retail provider example above, assume the wholesale provider is interested in a price recommendation that effectively decreases the prices to a $0.04 per minute of use, resulting in a proposed price rate change of $0.01. Based on a current MOU of 50 for the retail provider services being offered by TSP, (e.g., network access, VOIP, video services), the PTO may execute the rate decrease equation to generate an expected MOU value of 105 for the proposed $0.01 price rate change.

Referring again to FIG. 4, the expected MOU for the proposed price rate change is used to determine whether the proposed price rate change should be used as the new price rate and/or to conduct a price test for the retail provider services currently being consumed at the customer destination (operation 406). Specifically, the PCCL may calculate the expected margin associated with the proposed price change and compare that value with the current margin. In cases where the expected margin is higher than the historical margin, the price rate change may be further considered or otherwise refined. In cases where the expected margin is lower or less than the current margin, the price change would be rejected. In another embodiment, the PCCL may assign an upper bound to the expected MOU and a lower bound to the expected MOU, effectively generating thresholds. If a given expected MOU falls below the lower bound, or if the expected MOU is above the upper bound, the corresponding price rate change on which the expected MOU is based, is considered to be outside the threshold range and therefore unacceptable.

When the price rate change is acceptable, the price rate change is provided to and stored in the price parameters database (operation 408). A user may view and approve the price rate change through the user interface. If approved (with or without modification), a customer price sheet is generated and distributed to the customer. The price rate change(s) are then loaded in the customer's LCR system or otherwise used. The effect of the price test on call volume is then seen by the system in call volume records when the price test is in effect. Depending on the change in consumer behavior relative to the price point increase, the PCCL may maintain the price point increase or revert to a previous or different price. For example, if the price point results in lower volume and/or margin at the recommended destination, the PCCL may revert back to the previous price point. These recommendations may be generated directly or after additional processing, such as Deseasonalization discussed below (above) significant change detection discussed below (above), outcome classification discussed further below, or otherwise.

In another embodiment, an acceptable price rate change may be used to prioritize workflow. In one example, a pricing manager at a wholesale provider may be responsible for managing rates across hundreds of retail network providers. Given the time required to execute a rate change with any given customer, a pricing manager may prioritize rate changes based on the expected value of each possible rate change. In this example, the PCCL could process price change recommendations for hundreds of retail network providers, and then using the expected MOU logic, calculate the expected value of each rate change. The pricing manager could then prioritize the rate changes to send as part of their daily workflow based on the estimated value of each rate change, which was calculated using the expected MOU logic.

Referring again to FIG. 2, the recommended price test may be approved or otherwise accepted and loaded into the destination's LCR system (operation 220). For example in one embodiment, a user may view and approve the test price through the user interface 120. If approved (with or without modification), a customer price sheet is generated and distributed to the customer. The prices are then loaded in the destination's LCR system or otherwise used when the LCR system is queried to connect a call. The effect of the price test on call volume is then seen by the system in call volume records where the price test is in effect.

In order to detect call volume changes at the identified destination, the system generates a probability of a change using the deseasonalized call volume data (operation 230). In particular, the system may deseasonalize call volume data corresponding to the identified destination, as described below.

Deseasonalization

Figure 6:
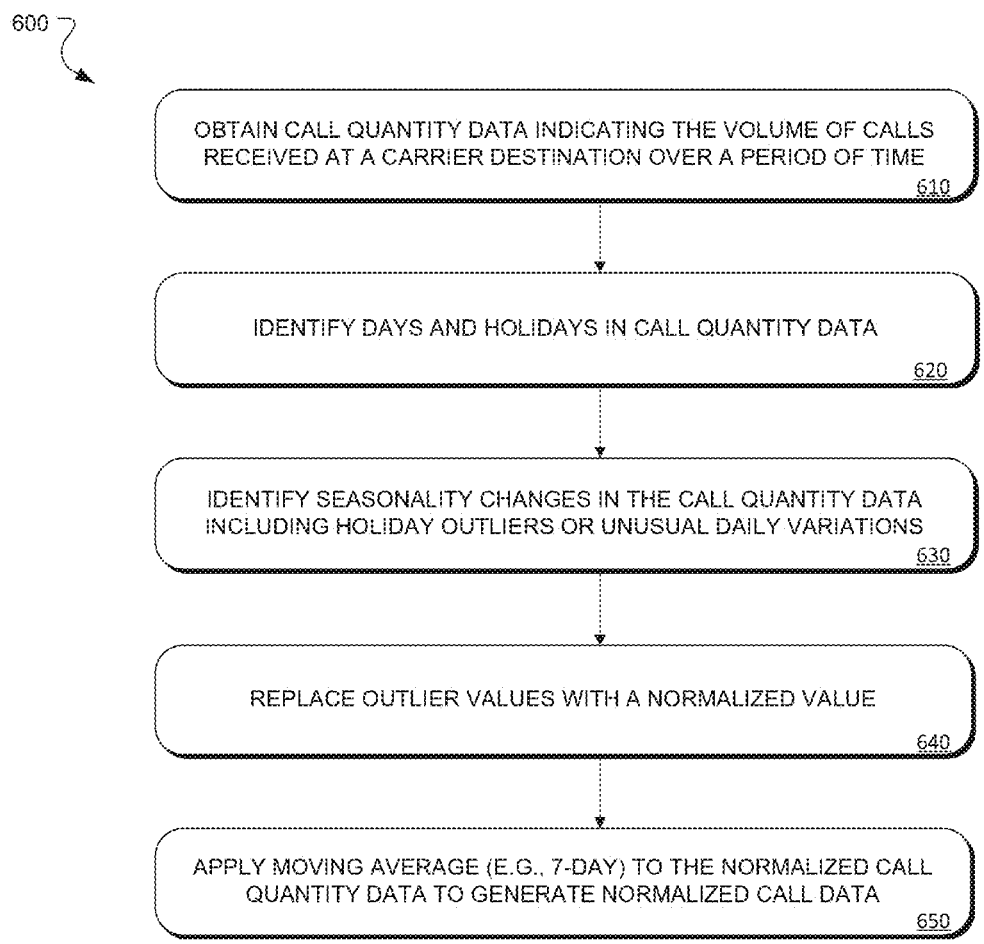
FIG. 6 is a flowchart illustrating one method of deseasonalizing call volume data, according to one embodiment described herein.
Figure 7A:
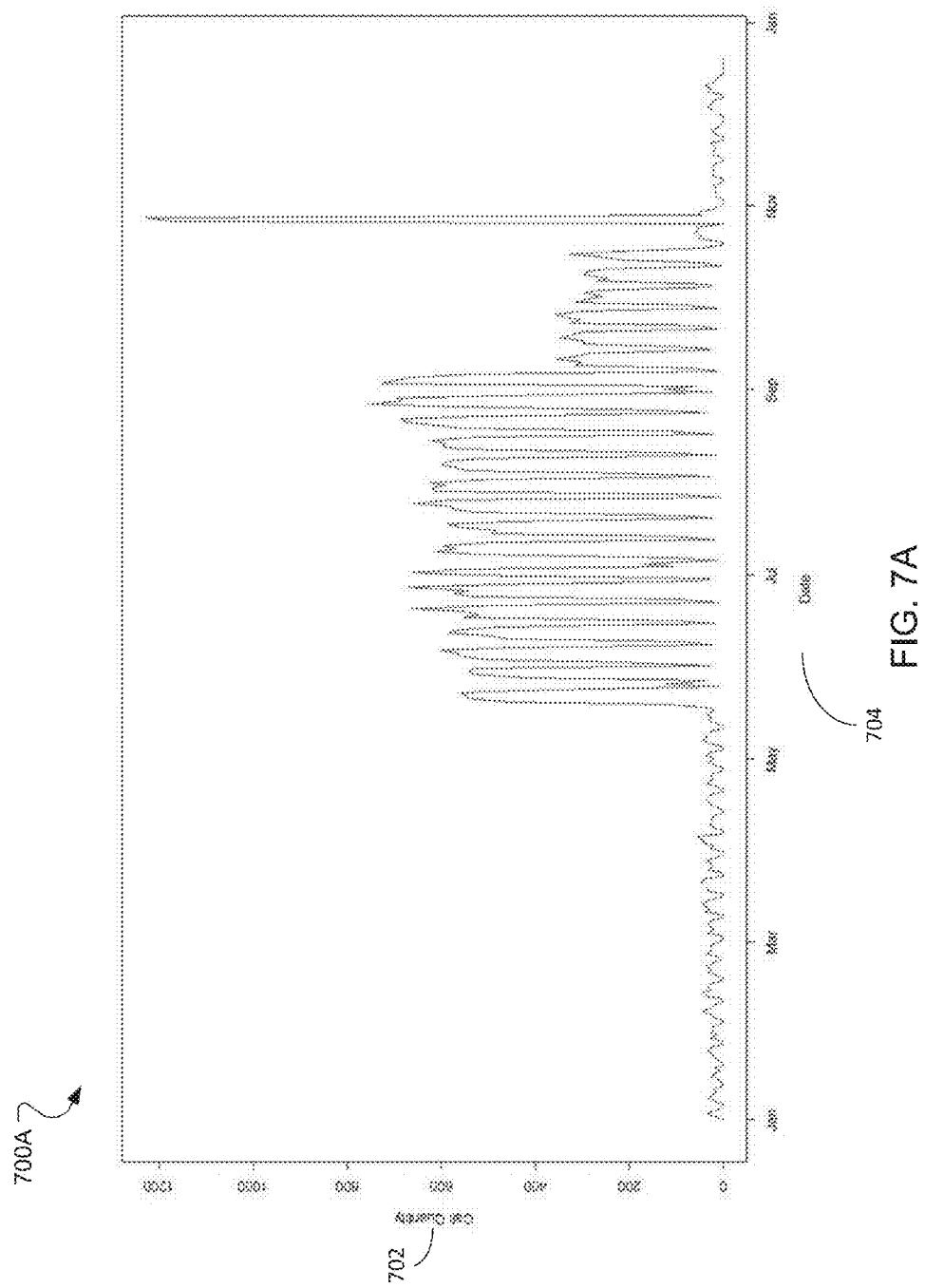
FIGS. 7A-7B are example graphical depictions of seasonal changes in call volume data, according to one embodiment of the present disclosure.

Referring now to FIG. 6, an example process 600 for deseasonalizing call volume data is provided. To begin, the PTO obtains call quantity data quantifying the volume of calls received at a particular carrier destination over a period of time (operation 610). The data in FIG. 7A shows call volume data for one year, but any suitable period may be used. Additionally, the system obtains or otherwise identifies the dates of any holidays for the call quantity data, as well as any days where unusual call data may be expected (operation 620). FIG. 7A graphically depicts call quantity data obtained by the PTO, according to one embodiment. As illustrated in the graph 700A, call quantity data values 702 range from 200 to 1200 for 12 months (704).

To deseasonalize the call quantity data, the PTO identifies changes in the call quantity data (operation 630), which may include identifying call volume changes caused by a holiday (i.e., a holiday outlier) or changes caused by some other unusual daily variation. For example, call volume may increase to some destinations on December 25th in response to users making calls to family and friends for the Christmas holiday. Similarly, call volume may decrease to other destinations on December 25th in response to business being closed and users therefore not making calls to those business destinations. As another example, call volume may increase on a random calendar day, such as June 15, in response to various unexpected weather events that occurred that day. Call volumes may also change if an erroneous price value is loaded into LCR tables causing more or less call connections. In order to detect the changes in the call quantity data, the PTO obtains or otherwise stores the call quantity data at a particular destination for N number of weeks to determine normal call quantity data levels at a current price. For example, the PTO may record and process the call quantity at a given destination for three weeks to determine average call quantity data levels for each day of the week over the three week period. A change is determined when the normal call quantity data at a particular time (e.g., a particular week day) exceeds an upper threshold, indicating that the call quantity data is abnormally above the call quantity data levels, and therefore a variation or outlier. Alternatively, a change may be determined when the normal call quantity data at a particular point in time falls below a lower threshold, indicating that the call quantity data is too far below normal call quantity data levels, and therefore indicative of a daily variation or outlier.

Any unusual variations and/or holiday outliers identified in the call quantity data are replaced with a normalized value (operation 640). Then, a seven-day average is applied to the normalized values to deseasonalize the effects of day of week variation/seasonality (operation 650). Accordingly, the 7-day average represents an average of the call volume data for the most recent seven days in a call volume data set. Each successive day, the average is recalculated with the most recent seven days of call volume data. The seven-day moving average is applied to the call quantity data to normalize the data. The normalization removes the effects on the day of the week or holiday factors in order for the PTO to have a normalized view of call volume data, which allows the system to more accurately identify call volume changes based on a price change by removing call volume changes that may be due the particular day of the week, or due to call being placed on a holiday. Alternatively, a 7 day moving average may be used, which is a calculation that analyzes data points by calculating a series of averages of different subsets of a full data set. Other averages are also possible including geometric averages and weighted averages. Other numbers of days, besides seven days may be used to generate the average. However, seven consecutive days is used in one example to always capture two weekend days and five week days.

Figure 7B:
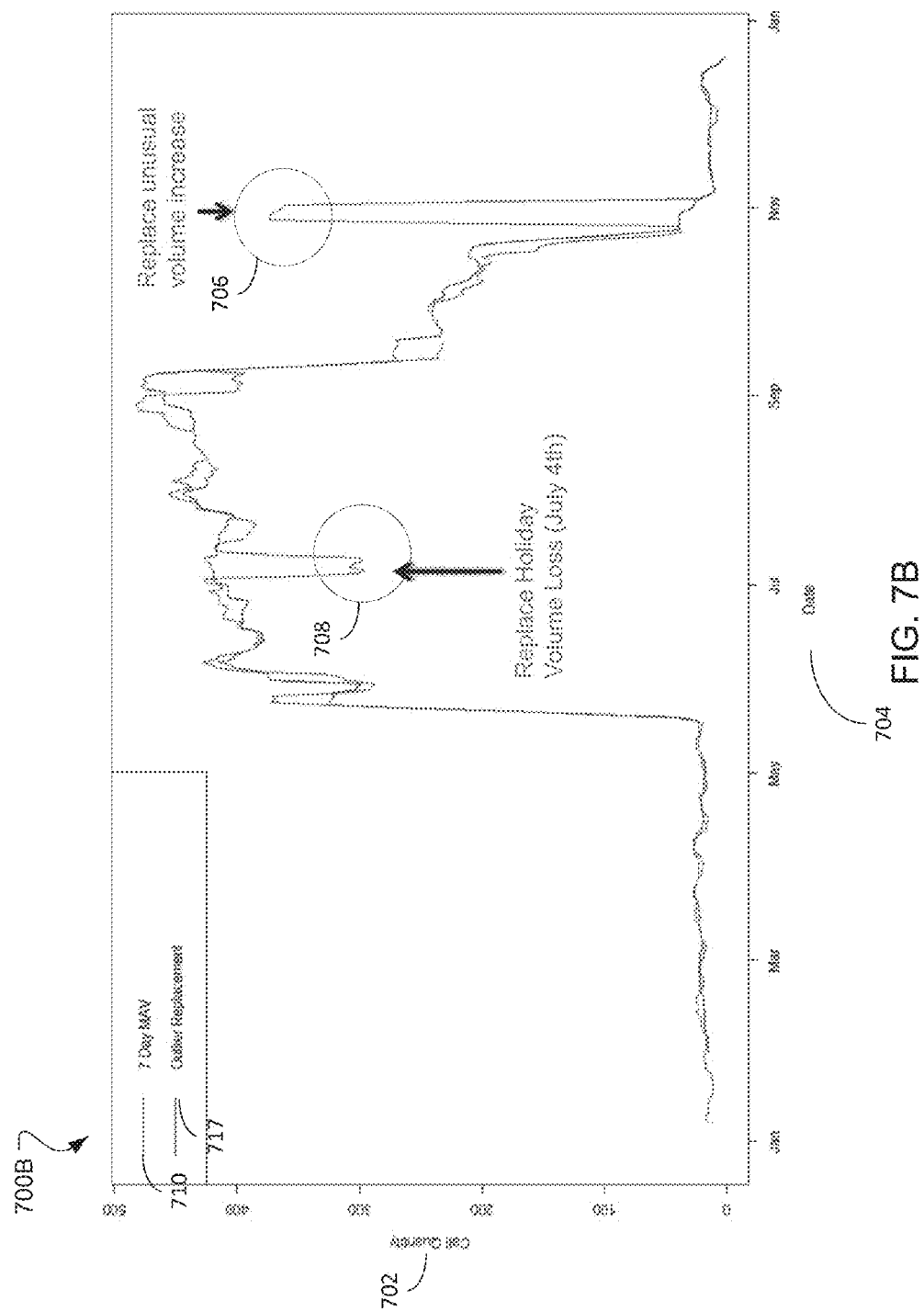

FIG. 7B provides an illustration of the replacement of call quantity data for both unusual variations and holidays. FIG. 7B illustrates a seven-day moving average of call quantity data 710 and call quantity data with outlier replacements 717. As illustrated in the graph 700B, an unusual increase in volume 706 is detected during the month of November in a twelve-month calendar year. Thus, the PTO removes the unusual increase in the call quantity data and applies a seven-day average value, effectively deseasonalizing the call quantity data from being affected by any day of the week variations. As also illustrated, an unusual decrease in volume 708 is identified on the 4th of July, a holiday. Since the unusual volume change occurred on a holiday, the unusual decrease in volume data is considered an outlier. In response, the PTO may remove the decrease in call volume data from and replace it with call volume data recorded seven days earlier or otherwise moving average data, effectively deseasonalizing the call quantity data from holiday call volume impacts.

The deseasonalized call quantity data may be used when assessing or implementing price change recommendations. More specifically, the deseasonalized call quantity data is used to accurately determine if volume changes within the call quantity data are based on price changes and not holidays and/or unusual daily variations. For example, any changes in call volume will be captured in the call records as call quantity data and subsequently provided by the PCCL to the PTO. The call quantity data may be deseasonalized to ensure that any changes in call volume are not simply responses to seasonality or unusual day events. Subsequently, the data may be analyzed to detect a change in call volumes. Subsequently, for example, upon detection of a call volume decrease within the deseasonalized call quantity data, the PTO may generate a price reversion recommendation to return to a former price or to otherwise decrease the price in order to recapture some or all of the lost volume. Alternatively, upon detection a call volume increase within the deseasonalized call quantity data, the PTO may generate a new, higher price recommendation. These recommendations may be generated directly after deseasonalization or after additional processing, such as significant change detection discussed below, or otherwise.

Referring again to FIG. 2, after the call volume data at the identified destination has been deseasonalized, the call volume data is analyzed to a determine a level of significant change. (operation 240). In some embodiments, whether or not a significant change has occurred, is then used to compute a margin for the price change to determine what financial impact the price change and volume change have had. In particular, the system may identify a significant change level for the call volume data, as described below.

Significant Change Detection

Figure 8:
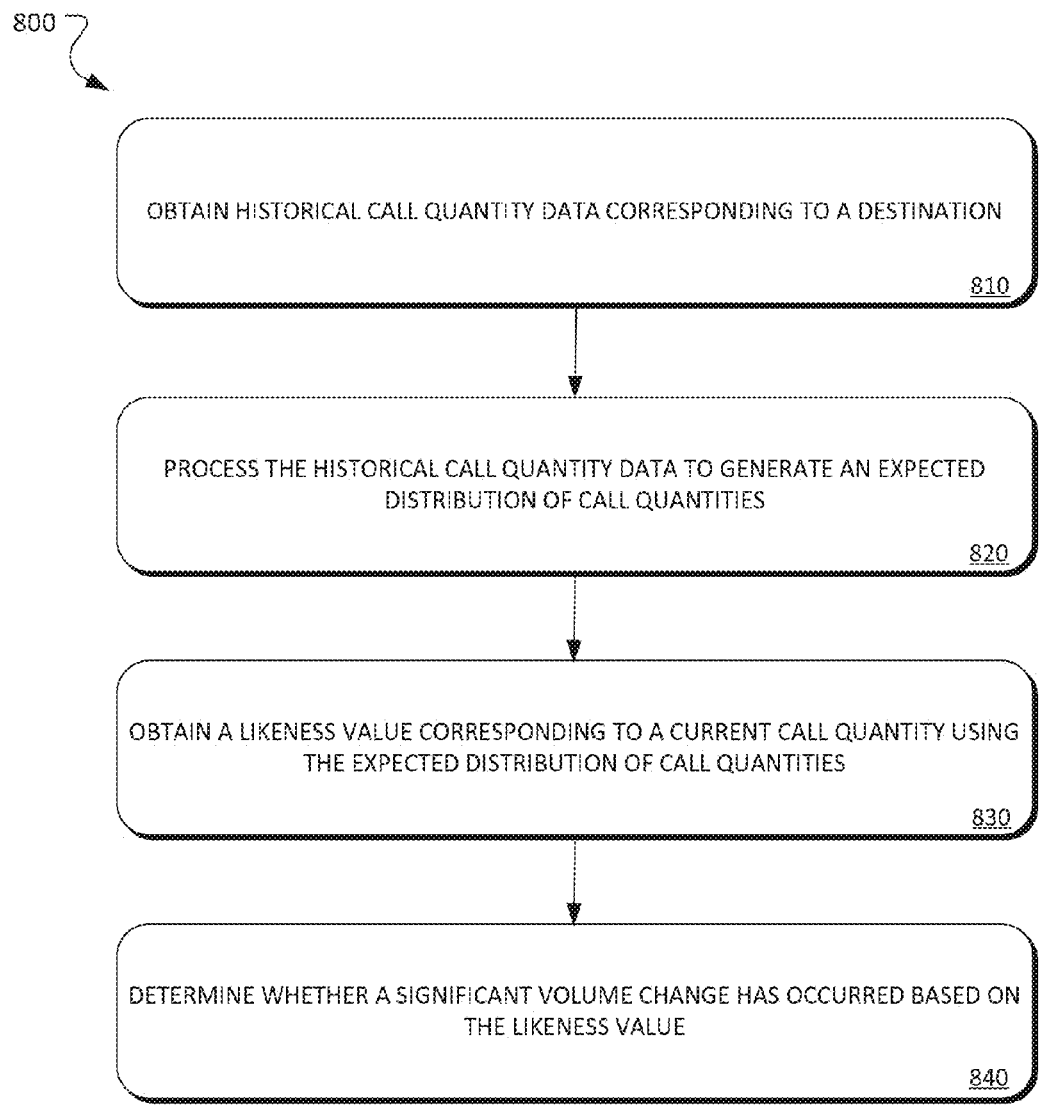
FIG. 8 a flowchart illustrating one method of performing significant change detection, according to one embodiment described herein.
Figure 9:
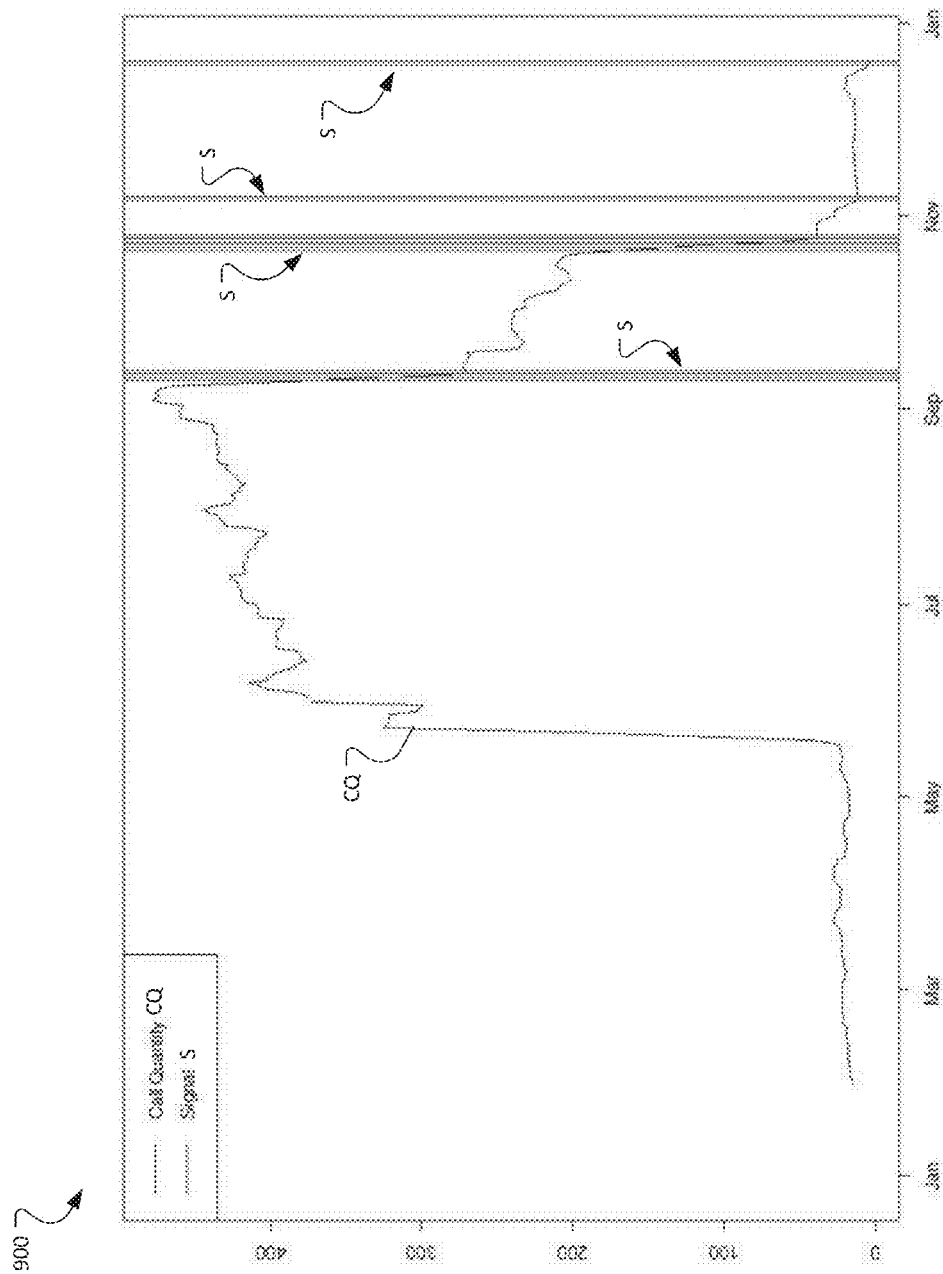
FIG. 9 provides an illustration of an example expected distribution, according to one embodiment described herein.
Figure 10:
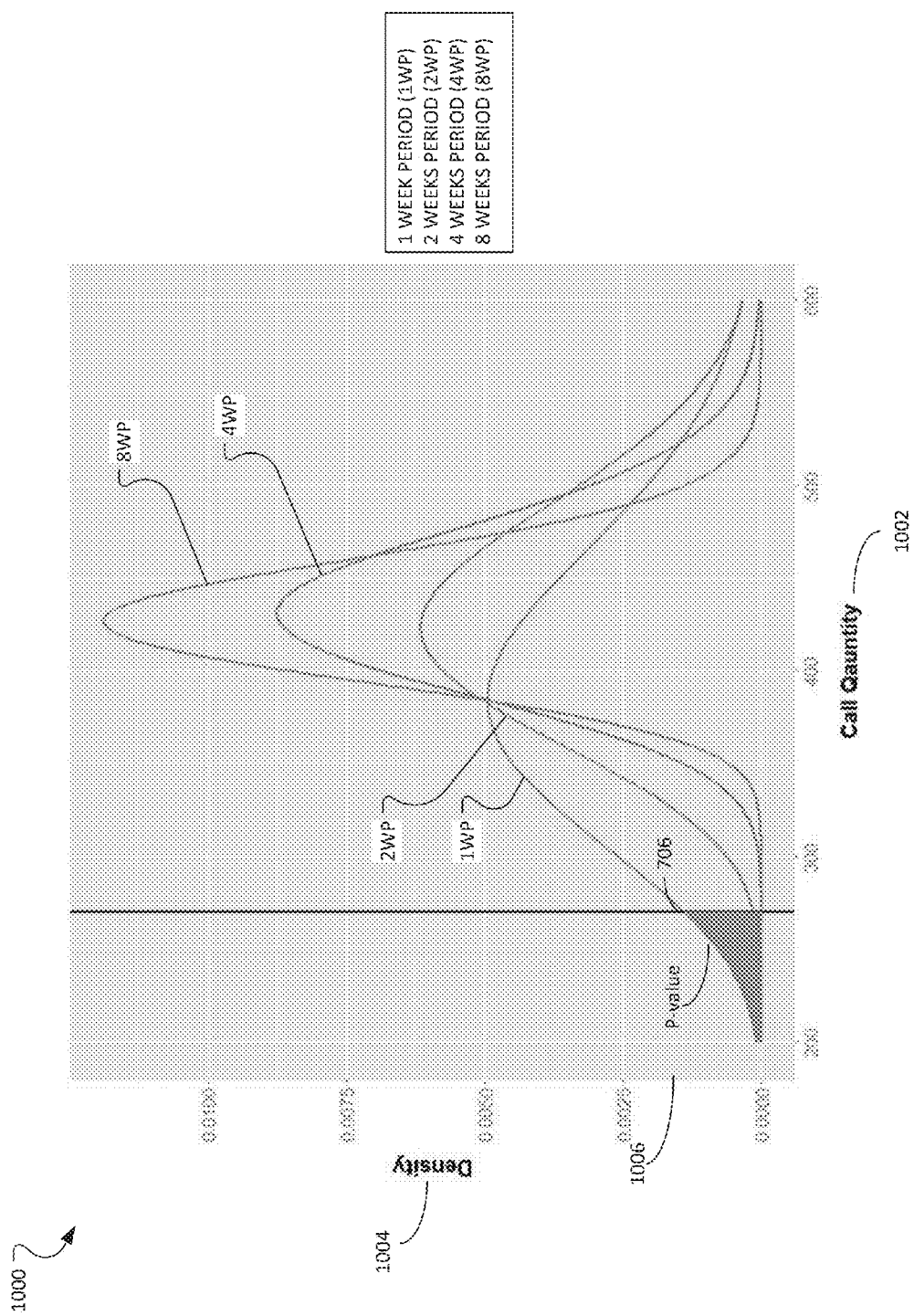
FIG. 10 provides an example distribution of weightings expected distribution, according to one embodiment described herein.

FIG. 8 is one example of a process that may be implemented by the PTO to identify, based on a price change or price recommendation, statistically significant volume changes at the destination level, also referred to herein as a probability of a change. These operations may be employed to determine whether a change has occurred, and whether changes in call volumes were the result of price changes or not, as introduced with reference to FIG. 2. To begin, the system obtains historical call quantity data corresponding to a particular carrier destination (operation 810). For example, assume a carrier has terminated calls for hundreds of different destinations. Historical call quantity data quantifies the number of calls received at such destinations. In one particular embodiment, the historical data may be deseasonalized, as discussed herein. Next, the historic call quantity data is used to generate an expected distribution of call quantities (operation 820). FIG. 9 provides an illustration 900 of historical call quantity for a destination. FIG. 10 provides an illustration of an example expected distribution of call quantities based on multiple historical observation ranges of call quantities, in accordance with aspects of the present disclosure. As illustrated in graph 1000, a particular call quantity value 1002 (e.g., 100, 200, 300, etc.) will be expected or otherwise observed at a certain density or rate 1004. Observing a call quantity of greater than or equal to (in the case of significant volume gain), or less than or equal to (in the case of significant volume loss) is typically referred to as the p-value and is the calculated area under the curve to the left or right of the call quantity. In the case of significant volume gain, the p-value is calculated as the area under the expected call quantity curve to the right of the observed call quantity. In the case of the significant volume loss, the p-value is calculated as the area under the expected call quantity curve to the left of the observed call quantity. The p-value is calculated for each of the expected distributions (differentiated by the historical observation ranges).

The expected distribution of call quantities is used to estimate a likeness value of a current call quantity (operation 830). Stated differently, current call quantity volume is provided as input to the expected distribution of call quantities to generate a likeness value for the current call quantity. Referring again to FIG. 10, if the new call quantity were 275 at location 1006 on the 8 week period curve, then the likeness (or probability) of precisely such a call quantity occurring would equate to 0.0013 (1008). The probability of having a call quantity less than or equal to 275 at location 1006 is the p-value, or area under the curve to the left of 1006 (labeled P-value and shaded).

FIG. 11A shows an example distribution of weightings 1100 used for combining the multiple p-values associated with different historical observation ranges, according to one embodiment. A lambda tuning parameter ($\lambda$) 1102 is used for selecting different weightings of recent versus historical observations. For example, a $\lambda$ parameter of 0 at 1104 would result in an equal weighting of the multiple p-values associated with different historical observation ranges. In another example, a $\lambda$ parameter of 1 at 1106 would result in full weight being given to the p-value based on the 1-week historical observation, and no weight being given to any other historical observation period. The appropriate A parameter will be selected through various means, including but not limited to manual user selection and Bayesian updating.

FIG. 1100B shows an application of the λ parameter to the p-values associated with four different expected distributions (1108, 1110, 1112, 1114) based on multiple historical observation ranges in the form of a chart 1100B. The output of this weighing is a λ weighted p-value. In the illustrated example, the λ weighted p-value is 0.020 (at 1109). The p-value would then be compared to an α-parameter to determine if the recent call quantity represents a significant change. If the λ weighted p-value is: 1) less than the α-parameter for a significant loss; or 2) greater than the α-parameter for a significant gain, then the process will classify the current observation as a significant change from the historical trend.

Referring again to FIG. 8, the likeness of the current call quantity is analyzed to determine whether a significant volume change has occurred (operation 840). More specifically, in order to detect significant changes, the system may compare the likeness of the current call quantity with a threshold, defined in this implementation as the α-parameter, which is one way in which the system determines if call volume changes are significant and hence the result of a price change as introduced with reference to FIG. 2. If the chance to have the current volume is smaller than the threshold (e.g., α-parameter of 0.050), indicating that the chance of having the current call volume is small, then a significant volume change signal is triggered. Referring to the 400 call quantity example of FIG. 10 (at 1006), a λ weighted p-value of 0.020 is compared to the threshold of 0.050. Since 0.020 is less than 0.050, a significant volume loss is detected, and thus, a loss signal is triggered. Subsequently, for example, upon detection of a call volume decrease, the PTO may generate a price reversion recommendation to return to a former price or to otherwise decrease the price in order to recapture some or all of the lost volume. Alternatively, upon detection a call volume increase within the deseasonalized call quantity data, the PTO may generate a new, higher price recommendation. These recommendations may be generated directly after significant change detection or after additional processing, such as outcome classification discussed further below, or otherwise.

Referring again to FIG. 2, based on the determined significant change level, the overall outcome or effect of the price change may be classified as acceptable or unacceptable (operation 240). In particular, the system may classify the outcome of the price change, as described below.

Price Change Outcome Classification

Figure 12:
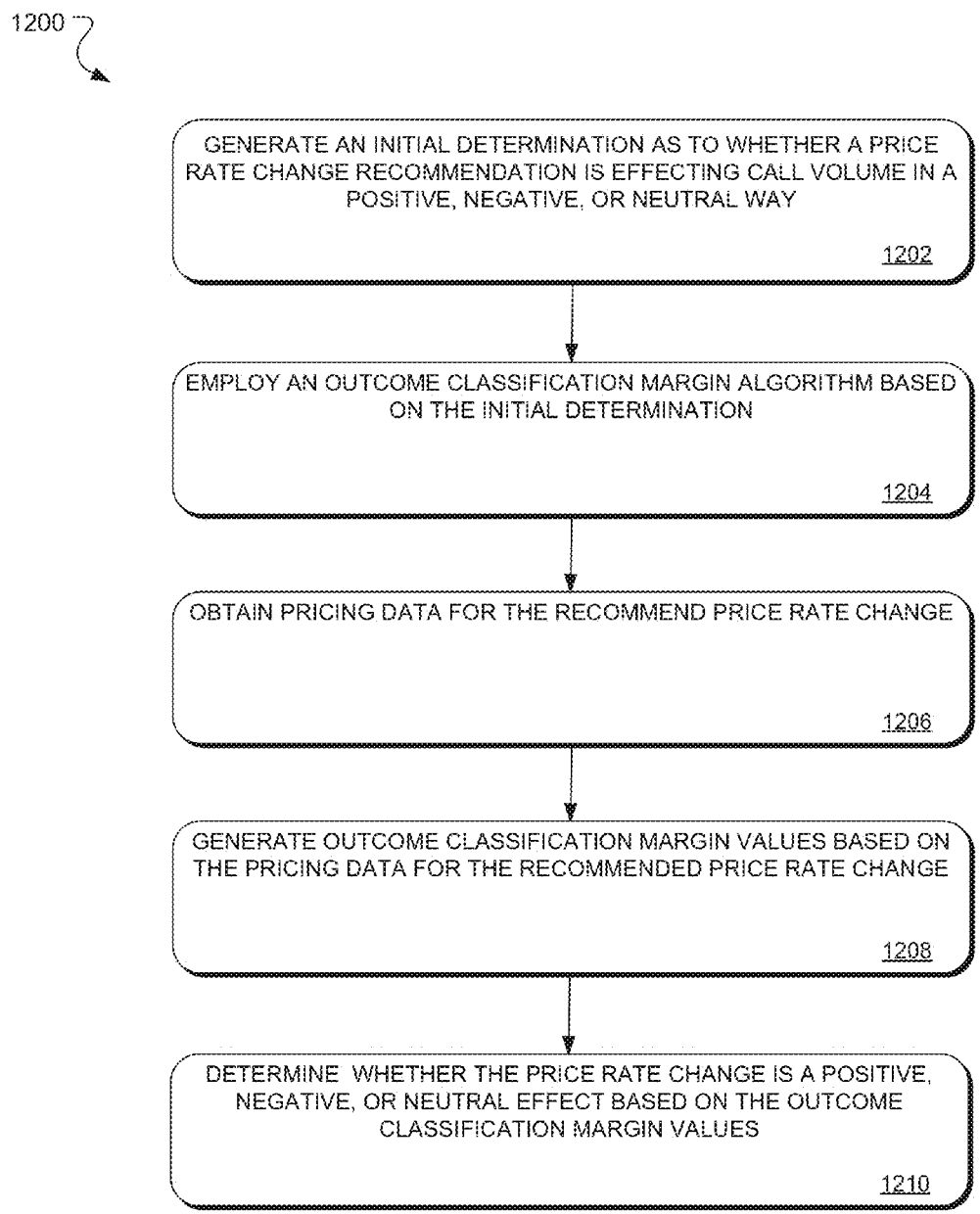
FIG. 12 is a flowchart illustrating one method of evaluating outcome classification margin change associated with a price rate change, according to one embodiment described herein.

FIG. 12 is one example of a computer implemented process or method that may be implemented by the PCCL to classify the outcomes and effects of price rate changes currently being applied at a customer destination. To begin, the system may obtain a implemented price change and make an initial determination as to whether the price change is affecting margin in a positive, negative, or neutral manner (operation 1202). In one embodiment, the initial determination may be based on the significant change level identified for the destination. FIG. 13 is an illustration of a table 1300 that illustrates the different significant change levels that an implemented price change may have on call volume 1302 at the identified destination, according to one embodiment. As illustrated, the PCCL may qualify a given price rate change type 1304 as either new, increase, or decrease. The PCCL accesses the identified significant change level assigned to the destination. For example and with reference to FIG. 13, the PCCL may determine that there was zero/low volume change significance level at 1306 in response to a decrease in price rate, resulting in a determination that the price rate change had a neutral effect on call volume data at 1308. As another example, the PCCL may determine that there was a significant decrease significance level in volume change at 1310 in response to a decrease in price rate, resulting in the PCCL determining that the price rate change had a negative effect on call volume data at 1312. In yet another example, the PCCL may identify that there was no significant increase (as a significance level) in volume change at 1314 in response to an increase in price rate, resulting in the PCCL determining that the price rate change had a positive effect on margin at 1316.

Referring again to FIG. 12, based on the significance level determination, the system may employ Outcome Classification Margin ("OCM") algorithm(s) to determine the effect of the price rate change on call volume data (operation 1204). For example and referring again to FIG. 13, the PCCL may determine that when there is a significant increase in volume at 1318, due to a decrease in rate change, the PCCL should employ the margin algorithm (at 1320) to quantify whether the price rate change is acceptable.

When the system determines that a margin calculation is required, the system obtains pricing records for the implemented price rate change and call data records that may be used to calculate margin values that quantify the difference between the price charged to a customer for consuming carrier services and the cost of providing such services (operation 1206). The pricing data may include, for example, a "$price_{new}$", which is the price provided to a customer after the rate change and a "$price_{old}$" which is the price that was provided to the customer prior to the rate change.

The pricing call records may include a "$qty_{new}$", which is the quantity of calls received from the retail provider for a period of time after the rate change and a "$qty_{old}$", which is the quantity of calls received from the retail provider for a period of time prior to the rate change. The period of time used to calculate "$qty_{old}$" and "$qty_{new}$" should be equal, and may be set to 7-days. In one embodiment, "$qty_{old}$" and "$qty_{new}$" may be deseasonalized. If the call quantity after the rate change is not significantly different (no change or low volume) then $qty_{new}$ $qty_{old}$. Otherwise, if call quantity after the rate change is significantly different $qty_{old}$ is equivalent to Holiday/Outlier replaced call quantity for the 7 days before the rate change implementation date, as defined by deseasonalization described above.

The pricing data may include an Adjusted Minutes Per Call Information ("Adjusted MPC") quantifying the minutes per call that is predicted for the destination in the future. In cases where the number of calls received for a destination is small, the observed minutes per call for the given sample may not be a good predictor of the minutes per call likely to be observed for the destination in the future. For example, if a wholesale provider network generally receives calls with an average duration of 5 minutes, and then a single 100 minute duration call is received for a destination under study, that single call sample is likely not a good predictor of the average minutes per call duration to expect in the future for the destination. In one embodiment, Adjusted MPC may be calculated using the following algorithm:

$$\text{Adjusted MPC} = MPC_{rateplan} + CORR_{cqr} * (MPC_{dest} - MPC_{rateplan})$$

In this equation $MPC_{rateplan}$ is the average minutes per call for the calls received across all destinations retail provided to the retail carrier. $MPC_{destination}$ is the average minutes per call for calls received at the specific destination. $CORR_{cqr}$ is a correlation factor representing the level of confidence in the accuracy of the average minutes per call at the specific destination, and can range between 0 and 1. A higher CORRcqr factor would signify a higher level of confidence that the observed average minutes per call at the destination is an accurate predictor of future expected minutes per call at the destination. $CORR_{cqr}$ may be dependent on the number of calls received at the destination, specifically if more calls are received at the destination the sample size is larger and there could be a higher level of confidence that the observed average minutes per call at the destination is a reasonable predictor of future minutes per call at the destination. Finally, the pricing data may include a "cost" value that quantifies the cost of providing services to a customer. The cost value may be calculated using the following algorithms:

If $qty_{new} >$ 0 for the 7 days beginning with the rate change implementation date, $$\text{calculate as } \frac{\text{total cost}_{new}}{mou_{new}}$$

Otherwise, $$\text{calculate as } \frac{\text{total cost}_{old}}{mou_{old}}$$

The pricing records and call data records are used as input to the OCM algorithms to generate or otherwise calculate new and old margin values that quantify the difference between the price charged to a retail provider for consuming wholesale provider services and the cost of providing such services before the price rate change recommendation and after the price rate change recommendation was applied (operation 1208). In one embodiment, price data including $qty_{new}$, mpc, $Price_{new}$ and cost may be provided as input to the PCCL, which generates or otherwise calculates "$margin_{new}$" using the following equation:

$$margin_{new} = (qty_{new} * mpc) * (price_{new} - cost)$$

In another embodiment, $qty_{old}$, mpc, $price_{old}$, and cost may be provided as input to the PCCL, which generates or otherwise calculates "$margin_{old}$" using the following equation:

$$margin_{old} = (qty_{old} * mpc) * ((price_{old} - cost)$$

Based on the calculated margin values, the PCCL may determine whether the price rate change had a positive, negative, or neutral effect (i.e., classification) on call volume data (operation 1210). More specifically, the calculated $margin_{new}$ is compared to the $margin_{old}$ value to determine whether the price rate change is considered a positive, negative, or neutral classification. If the $margin_{new}$ value is greater than the $margin_{old}$ value ($margin_{new}>margin_{old}$), then the classification is considered positive because higher margins where earned by offering the services to retail providers at the recommended price rate change. To determine whether the price rate change is negative based on the margin values, the following algorithms may be executed:

$$margin_{new} - margin_{old} < \$0.10, \text{ and}$$

$$\frac{margin_{new} - margin_{old}}{abs(margin_{old})} < 1\%$$

When the above algorithms are satisfied, the price rate change is considered to have had a negative impact on the margins earned by offering the services to customers. Thus, referring again to FIG. 2, the system may automatically generate a price reversion recommendation that may be propagated into the LCR system corresponding to the identified destination use in routing decisions (operation 260). If the margin values do not indicate that the price rate change is positive or negative, then the price rate change is considered to have no impact and no price reversion is generated.

Figure 14:
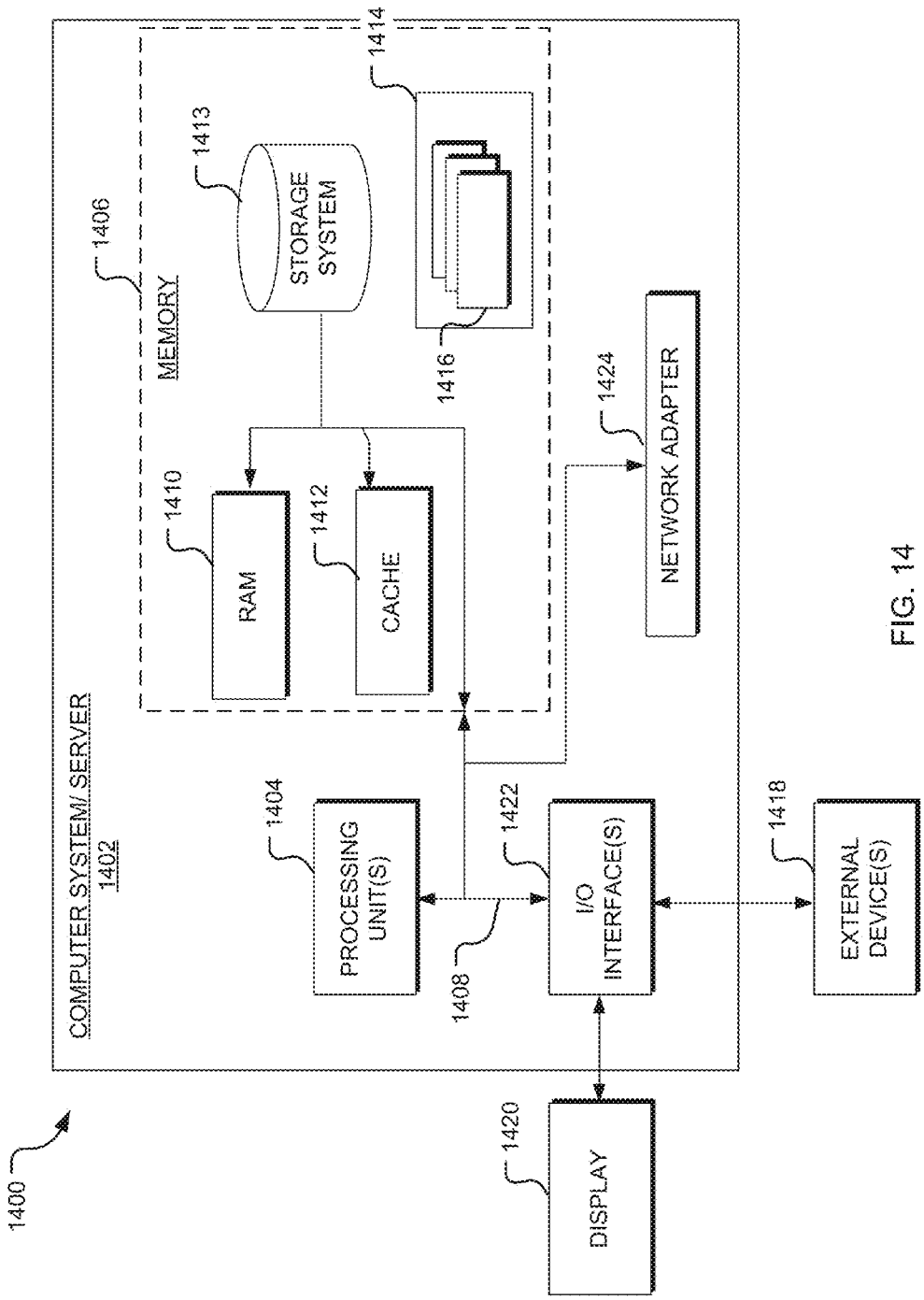
FIG. 14 is a block diagram of a computing device that may be used to implement various aspects of the present disclosure, according to one embodiment described herein.

FIG. 14 illustrates an example of a computing node 1400 which may comprise an implementation of the system PCCL. The computing node 1400 represents one example of a suitable computing device and is not intended to suggest any limitation as to the scope of use or functionality of embodiments of the invention described herein. Regardless, the computing node 1400 is capable of being implemented and/or performing any of the functionality described above.

As illustrated, the computer node 1400 includes a computer system/server 1402, which is operational with numerous other general purpose or special purpose computing system environments or configurations. Examples of well-known computing systems, environments, and/or configurations that may be suitable for use with computer system/server 1402 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1402 in computing node 1400 is shown in the form of a general-purpose computing device. The components of computer system/server 1402 may include one or more processors or processing units 1404, a system memory 1406, and a bus 1408 that couples various system components including system memory 1406 to processor 1404.

Bus 1408 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 may include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406, as well as an operating system, one or more application programs, other program modules, and program data. Each of the operating system, one or more application programs, other program modules, and program data or some combination thereof, may include an implementation of a networking environment. Program modules 1416 generally carry out the functions and/or methodologies of embodiments of the invention as described herein.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:
1. A method for routing telecommunications traffic comprising:
    in a telecommunication network with a plurality of carrier destinations with a connected network, identifying a subset of the plurality of carrier destinations to institute at least one price change at a new rate for carrying traffic;

generating a value indicative of an expected minutes of usage for the carrier destination if the new rate for carrying traffic at the subset of carrier destinations is implemented;

when the value indicative of the expected minutes of usage meets a threshold, propagating the new rate for the subset of the plurality of carrier destinations into a least cost routing system of the connected network;

wherein the least cost routing system of the connected network enables termination of traffic to carrier destinations in the subset of the plurality of carrier destinations via the telecommunication network at the new rate; and accepting telecommunications traffic from an origination via the connected network to a carrier destination in the plurality of carrier destinations according to the new rate.

2. The method of claim 1 wherein the threshold is a financial margin associated with actual minutes of usage at the subset of the plurality of carrier destinations, the method further comprising:

generating an expected financial margin for the expected minutes of usage at the subset of the plurality of carrier destinations; and when the expected financial margin for the expected minutes of usage at the subset of plurality of carrier destinations exceeds the financial margin for actual minutes of usage, populating the new rate for the subset of the plurality of carrier destinations into a least cost routing system of the connected network such that traffic between the telecommunication network and the connected network at the subset of the plurality of carrier destinations will be at the new rate.

3. The method of claim 2, wherein when the new rate is an increase relative to a current rate, generating the value indicative of the expected minutes of usage comprises:

executing, in at least one computing unit, computer instructions configured to obtain the value (MOUexp) as follows:

$$MOU_{exp.} = MOU_{cur.} * \text{Max}\left(\left[1 + c_1 + \left[e^{c_2 + \ln\left(\frac{Final\ Rate}{Current\ Rate}\right)*c_3} - 1\right] * c_4\right], 0\right);$$

wherein $MOU_{exp}$ is the value indicative of the expected minutes of usage, $MOU_{cur.}$ is a current minutes of usage value, Current Rate is the current rate for carrying traffic for the connected network at the subset of the plurality of carrier destinations, Final Rate is the new rate, $C_1$ is a constant 1.0, $C_2$ is a constant −0.8, $C_3$ is a constant −10.0, and $C_4$ is a constant 2.0.

4. The method of claim 3, wherein when the new rate is a decrease relative to the current rate, generating the value indicative of the expected minutes of usage comprises:

executing, in the at least one computing unit, computer instructions configured to obtain the value (MOUexp) as follows:

$$MOU_{exp.} = MOU_{cur.} + \left[\left(\frac{Final\ Rate}{Current\ Rate} - 1\right) * c_1 + c_2\right] * c_3;$$

wherein $MOU_{exp}$ is the value indicative of the expected minutes of usage, $MOU_{cur.}$ is a current minutes of usage value, Current Rate is the current rate for carrying traffic for the connected network at the subset of the plurality of carrier destinations, Final Rate is the new rate, $C_1$ is a constant −50.0; $C_2$ is a constant 1.0, and $C_3$ is a constant 5.0.

5. The method of claim 1 wherein, identifying a subset of the plurality of carrier destinations to institute at least one price change at the new rate comprises identifying the subset of the plurality of carrier destinations from a pool of carrier destinations based on a weight applied to each carrier destination in the pool of carrier destinations and based on a gross margin percentage associated with each carrier destination in the pool of carrier destinations, wherein the gross margin percentage quantifies a portion of profits earned by the telecommunication network for carrying traffic for the at least one carrier destination.

6. The method of claim 5, wherein identifying the at least one carrier destination based on the gross margin percentage comprises:

comparing the gross margin percentage of at least one carrier destination of the pool of carrier destinations to a maximum gross margin percentage threshold; and based on the comparison, adding the at least one carrier destination of the pool of carrier destinations to the subset of carrier destinations when the maximum gross margin percentage threshold is not exceeded.

7. A telecommunications system comprising:

a least cost routing system configured to carry traffic for a plurality of carrier destinations, the least cost routing system having a new rate for carrying the traffic at the plurality of carrier destinations generated and loaded into the least cost routing system according to a method of:

identifying a subset of the plurality of carrier destinations to institute at least one price change at the new rate for carrying traffic;

generating a value indicative of an expected minutes of usage for the carrier destination if the new rate for carrying traffic at the subset of carrier destinations is implemented;

when the value indicative of the expected minutes of usage meets a threshold, propagating the new rate for the subset of the plurality of carrier destinations into the least cost routing system;

accepting telecommunications traffic from an origination via the connected network to a carrier destination in the plurality of carrier destination according to the new rate; and terminating the telecommunications traffic from the connected network to the carrier destination in the plurality of carrier destinations.

8. The telecommunications system of claim 7 wherein the threshold is a financial margin associated with actual minutes of usage at the subset of the plurality of carrier destinations, the method further comprising:

generating an expected financial margin for the expected minutes of usage at the subset of the plurality of carrier destinations;

when the expected financial margin for the expected minutes of usage at the subset of plurality of carrier destinations exceeds the financial margin for actual minutes of usage, providing for loading the new rate for the subset of the plurality of carrier destinations into the least cost routing system of a connected network such that traffic between the telecommunication network and the connected network at the subset of the plurality of carrier destinations will be at the new rate.

9. The telecommunications system of claim 8 wherein when the new rate is an increase relative to a current rate, generating the value indicative of the expected minutes of usage comprises:

executing, in at least one computing unit, computer instructions configured to obtain the value (MOUexp) as follows:

$$MOU_{exp.} = MOU_{cur.} * \text{Max}\left(\left[1 + c_1 + \left[e^{c_2 + \ln\left(\frac{\text{Final Rate}}{\text{Current Rate}}\right) * c_3} - 1\right] * c_4\right], 0\right);$$

wherein $MOU_{exp}$ is the value indicative of the expected minutes of usage, $MOU_{cur}$ is a current minutes of usage value, Current Rate is the current rate for carrying traffic for the connected network at the subset of the plurality of carrier destinations, Final Rate is the new rate, $C_1$ is a constant 1.0, $C_2$ is a constant $-0.8$, $C_3$ is a constant $-10.0$, and $C_4$ is a constant 2.0.

10. The telecommunications system of claim 9, wherein when the new rate is a decrease relative to the current rate, generating the value indicative of the expected minutes of usage comprises:

executing, in the at least one computing unit, computer instructions configured to obtain the value (MOUexp) as follows:

$$MOU_{exp.} = MOU_{cur.} + \left[\left(\frac{\text{Final Rate}}{\text{Current Rate}} - 1\right) * c_1 + c_2\right] * c_3;$$

wherein $MOU_{exp}$ is the value indicative of the expected minutes of usage, $MOU_{cur}$ is a current minutes of usage value, Current Rate is the current rate for carrying traffic for the connected network at the subset of the plurality of carrier destinations, Final Rate is the new rate, $C_1$ is a constant $-50.0$; $C_2$ is a constant 1.0, and $C_3$ is a constant 5.0.

11. The telecommunications system of claim 7 wherein, identifying a subset of the plurality of carrier destinations to institute at least one price change at the new rate comprises identifying the subset of the plurality of carrier destinations from a pool of carrier destinations based on a weight applied to each carrier destination in the pool of carrier destinations and based on a gross margin percentage associated with each carrier destination in the pool of carrier destinations, wherein the gross margin percentage quantifies a portion of profits earned by a telecommunication network for carrying traffic for the at least one carrier destination.

12. The telecommunications system of claim 11, wherein identifying the at least one carrier destination based on the gross margin percentage comprises:

comparing the gross margin percentage of at least one carrier destination of the pool of carrier destinations to a maximum gross margin percentage threshold; and
based on the comparison, adding the at least one carrier destination of the pool of carrier destinations to the subset of carrier destinations when the maximum gross margin percentage threshold is not exceeded.

13. A non-transitory computer readable media with computer executable instructions to perform a method of:

in a telecommunication network with a plurality of carrier destinations with a connected network, identifying a subset of the plurality of carrier destinations to institute at least one price change at a new rate for carrying traffic;

generating a value indicative of an expected minutes of usage for the carrier destination if the new rate for carrying traffic at the subset of carrier destinations is implemented;

when the value indicative of the expected minutes of usage meets a threshold, propagating the new rate for the subset of the plurality of carrier destinations into a least cost routing system of the connected network such that traffic between the telecommunication network and the connected network at the subset of the plurality of carrier destinations will be at the new rate; and terminating the telecommunications traffic from the connected network to the carrier destination in the plurality of carrier destinations.

14. The non-transitory computer readable media of claim 13 wherein the threshold is a financial margin associated with actual minutes of usage at the subset of the plurality of carrier destinations, the method further comprising:

generating an expected financial margin for the expected minutes of usage at the subset of the plurality of carrier destinations;

when the expected financial margin for the expected minutes of usage at the subset of plurality of carrier destinations exceeds the financial margin for actual minutes of usage, providing for loading the new rate for the subset of the plurality of carrier destinations into a least cost routing system of the connected network such that traffic between the telecommunication network and the connected network at the subset of the plurality of carrier destinations will be at the new rate.

15. The non-transitory computer readable media of claim 14 wherein when the new rate is an increase relative to a current rate, and generating the value indicative of the expected minutes of usage comprises:

executing, in at least one computing unit, computer instructions configured to obtain the value (MOUexp) as follows:

$$MOU_{exp.} = MOU_{cur.} * \text{Max}\left(\left[1 + c_1 + \left[e^{c_2 + \ln\left(\frac{\text{Final Rate}}{\text{Current Rate}}\right) * c_3} - 1\right] * c_4\right], 0\right);$$

wherein $MOU_{exp}$ is the value indicative of the expected minutes of usage, $MOU_{cur}$ is a current minutes of usage value, Current Rate is the current rate for carrying traffic for the connected network at the subset of the plurality of carrier destinations, Final Rate is the new rate, $C_1$ is a constant 1.0, $C_2$ is a constant $-0.8$, $C_3$ is a constant $-10.0$, and $C_4$ is a constant 2.0.

16. The non-transitory computer readable media of claim 15 wherein when the new rate is a decrease relative to the current rate, and generating the value indicative of the expected minutes of usage comprises:

executing, in the at least one computing unit, computer instructions configured to obtain the value (MOUexp) as follows:

$$MOU_{exp.} = MOU_{cur.} + \left[\left(\frac{\text{Final Rate}}{\text{Current Rate}} - 1\right) * c_1 + c_2\right] * c_3;$$

wherein $MOU_{exp}$ is the value indicative of the expected minutes of usage, $MOU_{cur}$ is a current minutes of usage value, Current Rate is the current rate for carrying traffic for the connected network at the subset of the plurality of carrier destinations, Final Rate is the new rate, $C_1$ is a constant −50.0; $C_2$ is a constant 1.0, and $C_3$ is a constant 5.0.

17. The non-transitory computer readable media of claim 13 wherein, identifying a subset of the plurality of carrier destinations to institute at least one price change at the new rate comprises identifying the subset of the plurality of carrier destinations from a pool of carrier destinations based on a weight applied to each carrier destination in the pool of carrier destinations and based on a gross margin percentage associated with each carrier destination in the pool of carrier destinations, wherein the gross margin percentage quantifies a portion of profits earned by the telecommunication network for carrying traffic for the at least one carrier destination.

18. The non-transitory computer readable media of claim 17 wherein identifying the at least one carrier destination based on the gross margin percentage comprises:
comparing a gross margin percentage of at least one carrier destination of the pool of carrier destinations to a maximum gross margin percentage threshold; and
based on the comparison, adding the at least one carrier destination of the pool of carrier destinations to the subset of carrier destinations when the maximum gross margin percentage threshold is not exceeded.

* * * * *